(12) United States Patent
Doi et al.

(10) Patent No.: US 7,884,900 B2
(45) Date of Patent: Feb. 8, 2011

(54) LIQUID CRYSTAL DISPLAY DEVICE WITH PARTITION WALLS MADE OF COLOR FILTER LAYERS AS A DAM FOR THE LIGHT SHIELDING MATERIAL

(75) Inventors: Takashi Doi, Fukaya (JP); Hiroyuki Nagata, Kumagaya (JP); Norihisa Nakao, Honjo (JP); Kiyoshi Shohara, Saitama (JP); Minako Hamamoto, Ageo (JP); Takeshi Yamamoto, Fukaya (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 495 days.

(21) Appl. No.: 11/439,121

(22) Filed: May 24, 2006

(65) Prior Publication Data

US 2006/0267969 A1 Nov. 30, 2006

(30) Foreign Application Priority Data

| May 26, 2005 | (JP) | ............................. 2005-154522 |
| Aug. 19, 2005 | (JP) | ............................. 2005-239045 |
| Feb. 8, 2006 | (JP) | ............................. 2006-031653 |

(51) Int. Cl.
*G02F 1/1333* (2006.01)
*G02F 1/1335* (2006.01)

(52) U.S. Cl. ...................... 349/110; 349/106

(58) Field of Classification Search ......... 349/106–111, 349/153, 156
See application file for complete search history.

(56) References Cited

U.S. PATENT DOCUMENTS

| 5,568,293 | A * | 10/1996 | Takao et al. ................ 349/106 |
| 6,238,827 | B1 * | 5/2001 | Nakazawa et al. ............. 430/7 |
| 6,281,960 | B1 * | 8/2001 | Kishimoto et al. ........... 349/156 |
| 6,392,729 | B1 | 5/2002 | Izumi et al. |
| 6,414,733 | B1 | 7/2002 | Ishikawa et al. |
| 6,630,274 | B1 * | 10/2003 | Kiguchi et al. ................ 430/7 |
| 6,667,795 | B2 * | 12/2003 | Shigemura ................. 349/187 |
| 6,798,474 | B2 * | 9/2004 | Matsushima et al. ........ 349/110 |
| 2001/0012079 | A1 * | 8/2001 | Yamamoto et al. ......... 349/106 |

(Continued)

FOREIGN PATENT DOCUMENTS

CN 1444059 A 9/2003

(Continued)

*Primary Examiner*—David Nelms
*Assistant Examiner*—Jessica M Merlin
(74) *Attorney, Agent, or Firm*—Oblon, Spivak, McClelland, Maier & Neustadt, L.L.P.

(57) ABSTRACT

A color filter layer is formed on a glass substrate of a counter substrate. A bank pattern is formed of the same material as a red color-filter portion, a green color filter portion and a blue color filter portion of the color filter layer at the outside of the color filter layer on the glass substrate in the same step. A light shielding material is coated in a bank between the bank pattern and the color filter layer to form a light shielding layer. The light shielding layer can be formed so as to be continuous with the peripheral edge of the color filter layer. The light shielding layer is less likely to overlap with the inside of a display frame portion of the liquid crystal panel, and the aperture ratio is less likely to be reduced. The number of manufacturing steps of the light shielding layer is reduced.

9 Claims, 16 Drawing Sheets

U.S. PATENT DOCUMENTS

| | | | |
|---|---|---|---|
| 2003/0016459 A1* | 1/2003 | Takizawa et al. | 359/885 |
| 2003/0151714 A1* | 8/2003 | Takahashi et al. | 349/153 |
| 2005/0094061 A1* | 5/2005 | Lee et al. | 349/106 |

FOREIGN PATENT DOCUMENTS

| | | | |
|---|---|---|---|
| JP | 10-148713 | | 6/1998 |
| JP | 10-170712 | | 6/1998 |
| JP | 2000-122072 | | 4/2000 |
| JP | 2000-193819 | | 7/2000 |
| JP | 2000-353594 | | 12/2000 |
| JP | 2001-021877 | | 1/2001 |
| JP | 2002-55223 | | 2/2002 |
| JP | 2002055223 A | * | 2/2002 |
| JP | 2003-222877 | | 8/2003 |
| TW | 536478 | | 6/2003 |
| TW | 561304 | | 11/2003 |
| TW | 1227354 | | 2/2005 |

* cited by examiner

LIQUID CRYSTAL DISPLAY DEVICE WITH PARTITION WALLS MADE OF COLOR FILTER LAYERS AS A DAM FOR THE LIGHT SHIELDING MATERIAL

INCORPORATION BY REFERENCE

The present application claims priority under 35 U.S.C. §119 to Japanese Patent Application Nos. 2005-154522 filed on May 26, 2005, 2005-239045 filed on Aug. 19, 2005 and 2006-031653 filed on Feb. 8, 2006. The content of the application is incorporated herein by reference in their entirety.

FIELD OF THE INVENTION

The present invention relates to a liquid crystal display device having a light shielding layer for shielding a light shielded area arranged along the outer periphery of a display area in which an image is displayed, and a method of producing the liquid crystal display device.

BACKGROUND OF THE INVENTION

At present, each of the generally available liquid crystal display devices is constructed by interposing liquid crystal between an array substrate and a counter substrate. The portions of the peripheral edges of the array substrate and the counter substrate, except for a liquid crystal sealing port, are fixed to each other by adhesive agent, and the liquid crystal sealing port is sealed by sealing agent. Furthermore, plastic beads or the like that are uniform in particle diameter are dispersed between the array substrate and the counter substrate as a spacer for keeping constant the distance between the array substrate and the counter substrate.

Furthermore, out of these liquid crystal display devices, a liquid crystal display device that can perform color display is constructed such that a color filter layer constituted by colored layers of R (Red), G (Green) and B (Blue) is formed on any one of the array substrate and the counter substrate of the liquid crystal display device. As a display type of the liquid crystal display device, TN (Twisted Nematic) type, ST (Super Twisted Nematic) type, GH (Guest Host) type, ECB (Electrically Controlled Birefringence) type, ferroelectric liquid crystal or the like is used. Furthermore, as the sealing agent, acrylic or epoxy type adhesive agent or the like of thermosetting type which is thermally-curable with heat or ultraviolet curable type which is curable with irradiation of ultraviolet rays is used.

Also, the liquid display device that can perform color display is formed as follows. That is, scanning lines and signal lines are provided to be arranged in a grid form on an insulating substrate, and thin film transistors (TFT) each having a semiconductor layer of amorphous silicon (a-Si) are provided in conformity with the cross points of the scanning lines and the signal lines, and pixel electrodes are electrically connected to these thin film transistors to thereby form an array substrate as an active matrix substrate. A counter substrate having a counter electrode is disposed so as to face the array substrate, and a color filter layer is provided below the counter electrode. Also, a frame portion having light shielding performance is provided at the peripheral edge of the color filter. Furthermore, an electrode transfer member as a transfer for applying a voltage from the array substrate to the counter substrate is disposed at the peripheral portion of the display frame between the array substrate and the counter substrate. Silver paste achieved by making a paste of electrically conductive silver particles with a binder or the like is used as the electrode transfer material. Also, each of the array substrate and the counter substrate is sandwiched by polarizing plates, and it is constructed as a light shutter to display a color image.

In this type of liquid crystal display device, for example, as described in Japanese Laid-Open Patent Publication No. 2000-122072, it is common that the color filter layer and the frame portion are formed on one principal surface of any one of the array substrate and the counter substrate by photolithography. The photolithography needs four processing steps such as coating, light exposure, development and baking, and thus, the manufacturing cost cannot be easily reduced. Therefore, there is known a method of forming a color filter layer by printing based on ink jetting as described in Japanese Laid-Open Patent Publication No. 10-170712 or Japanese Laid-Open Patent Publication No. 2002-55223.

As the ink jetting system are known a method of providing a new reception layer on one principal surface of any one of the array substrate and the counter substrate and staining from the surface of the reception layer as described in Japanese Laid-Open Patent Publication No. 10-148713 or a method of providing a discrete bank-like pattern on one principal surface of any one of the array substrate and the counter substrate so as to project from the principal surface and coating a colored layer between the bank-like pattern as described in Japanese Laid-Open Patent Publication No. 2000-353594.

However, when the color filter layer and the frame portion are formed by the printing based on the ink jetting described above, the bank-like pattern is needed, and thus, the aperture ratio of the liquid crystal display device may be reduced. Also, when the color filter layer and the frame portion are formed by using photolithography, four steps are needed as the manufacturing process of forming the color filter layer and the frame portion, and thus, there is a problem that the manufacturing is not easy.

The present invention has been implemented in view of the foregoing point, and has an object to provide a liquid crystal display device that can be easily manufactured and in which the aperture ratio is hardly reduced, and a method of producing the liquid crystal display device.

SUMMARY OF THE INVENTION

According to the present invention, in a method of producing a liquid crystal display device including, on a light transmissible substrate, pixels that are arranged in a display area for displaying an image and have a color filter layer including colored layers of a plurality of colors, and a light shielding layer for light-shielding a light shielded area arranged along the outer periphery of the display area, when the color filter layer is formed on the light transmissible substrate, a dam pattern is formed at the peripheral edge of the color filter layer by material used for the color filter layer, and a light shielding material is coated at the peripheral edge of the color filter layer and dammed by the dam pattern, whereby the light shielding layer is formed so as to surround the outer periphery of the color filter layer.

When the color filter layer is formed on the light transmissible substrate, the dam pattern is formed at the peripheral edge of the color filter layer by the material used for the color filter layer, and then the light shielding material is coated at the peripheral edge of the color filter layer and dammed by the dam pattern to form the light shielding layer surrounding the outer periphery of the color filter layer, whereby the light shielding layer can be formed at the peripheral edge of the color filter layer without forming a bank-like pattern or the like. Therefore, the aperture ratio is hardly reduced. Also, as compared with the case where the light shielding later is separately formed by using the photolithography, the number of manufacturing processes becomes smaller and thus, the liquid crystal display device can be easily manufactured.

DETAILED DESCRIPTION OF THE PREFERRED EMBODIMENT

Figure 1:
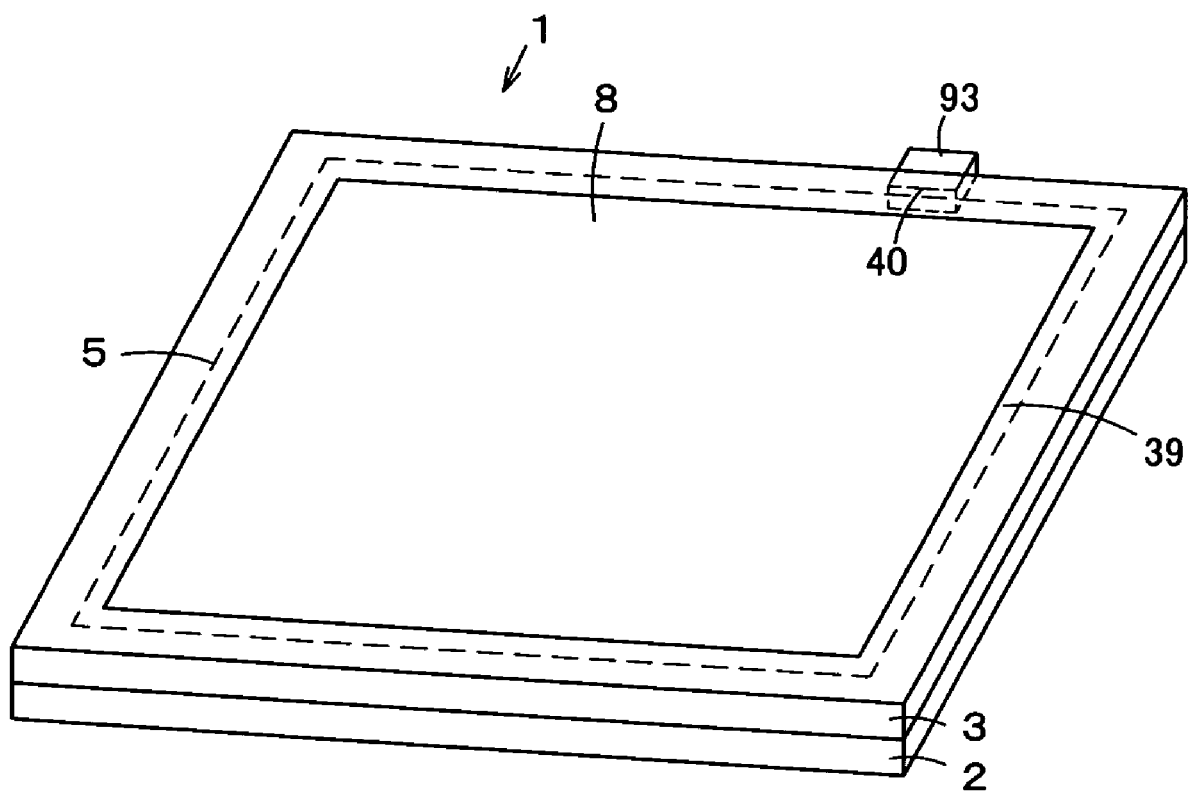
FIG. 1 is a perspective view showing a first embodiment of a liquid crystal display device of the present invention.
Figure 2:
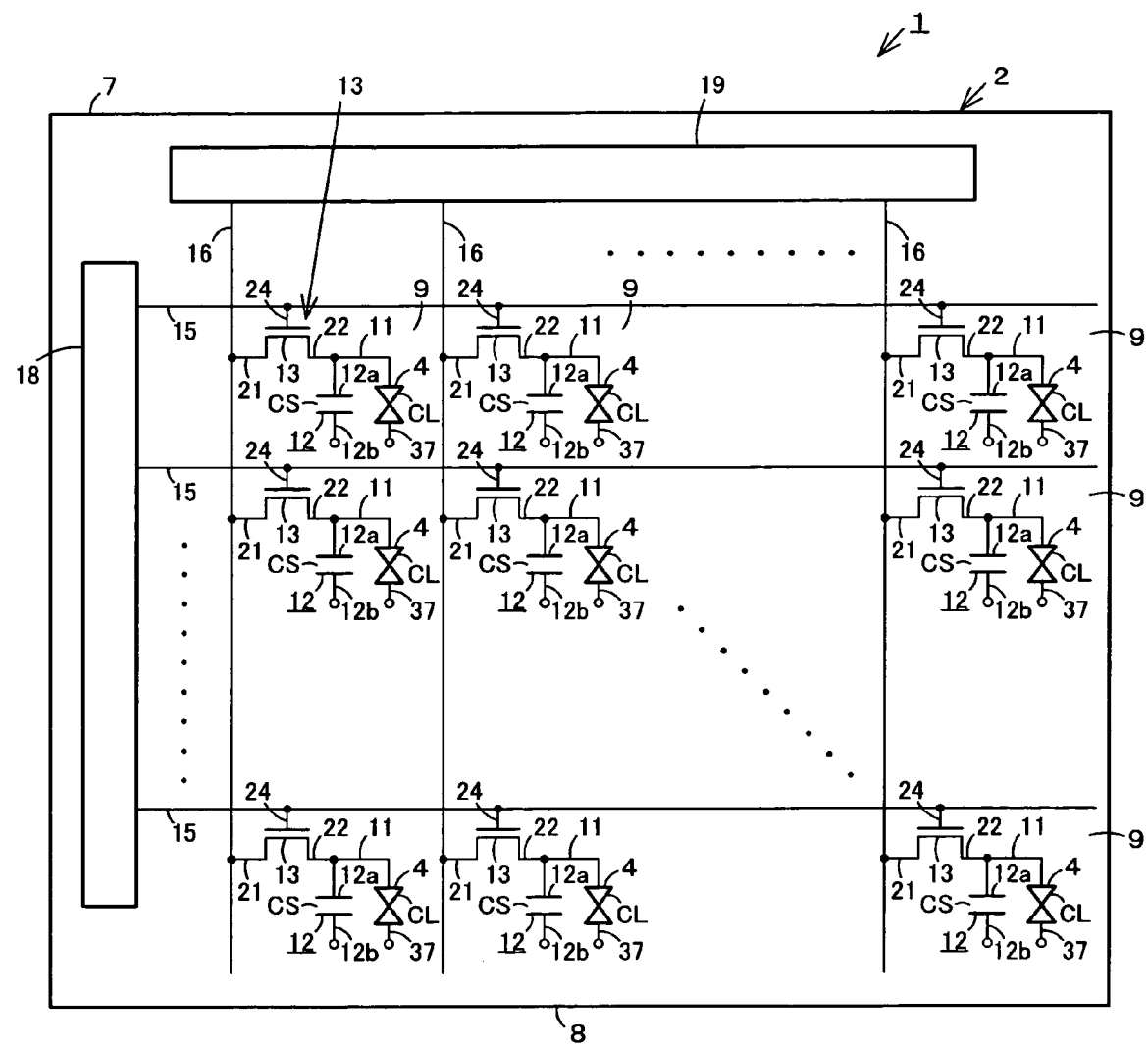
FIG. 2 is a diagram showing the circuit construction of a liquid crystal display device.
Figure 3:
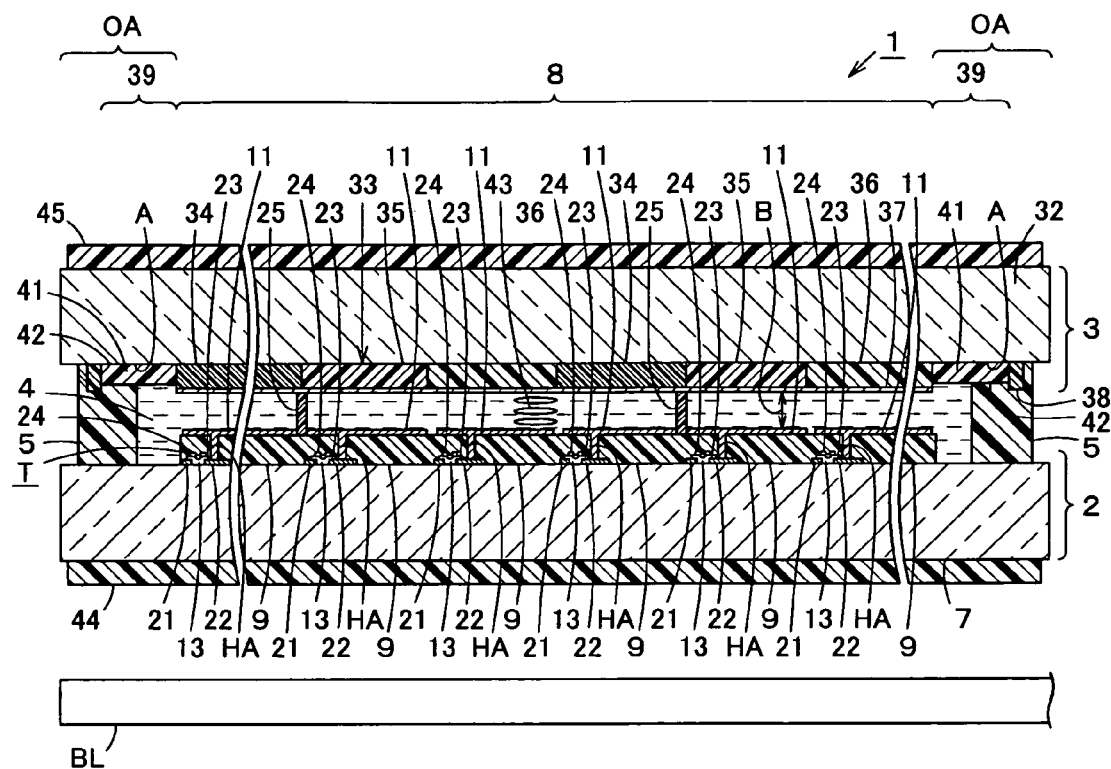
FIG. 3 is a cross-sectional view showing the liquid crystal display device.
Figure 4:
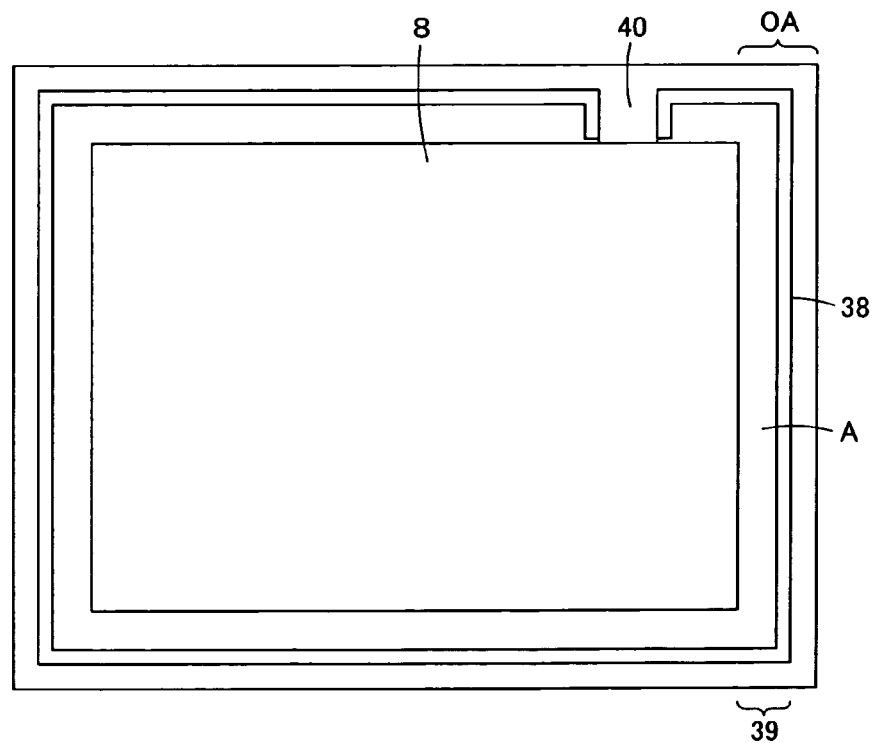
FIG. 4 is a plan view showing the liquid crystal display device.

The construction of a first embodiment of a liquid crystal display device according to the present invention will be described with reference to the drawings.

In FIGS. 1 to 4, reference numeral 1 represents a liquid crystal panel which is a liquid crystal display panel as a planar display device, and this liquid crystal panel 1 is a liquid crystal display device as an active matrix type liquid crystal display element using thin film transistors (TFT). The liquid crystal panel 1 is equipped with a substantially rectangular flat plate type array substrate 2 as an active matrix substrate, a counter substrate 3 disposed so as to face the array substrate 2 and a liquid crystal layer 4 arranged between the array substrate 2 and the counter substrate 3. The array substrate 2 and the counter substrate 3 are attached to each other by a seal material 5 as a seal member while a predetermined gap is formed to sandwich the liquid crystal layer 4.

The liquid crystal panel 1 is designed as a transmission type for selectively transmitting light from the array substrate 2 side to the counter substrate 3 side. Therefore, a back light unit BL for illuminating the liquid crystal panel 1 from the back surface thereof is provided to the back surface of the transmission type liquid crystal panel 1 (the outer surface side of the array substrate 2).

The array substrate 2 is an XGA (extended Graphics Array) type thin film transistor (TFT) substrate, and it has a light transmissible substrate as a substantially transparent rectangular flat plate type insulating substrate, that is, a glass substrate 7 as a translucent substrate.

Furthermore, a display frame portion 8 as an image display area is formed as a display area for displaying an image. A plurality of pixels 9 are arranged in a matrix form in the display frame portion 8 on the glass substrate 7, and the display frame portion 8 is constructed by these pixels 9. With respect to the plurality of pixels 9, n pixels are formed along the longitudinal direction of the glass substrate 7, and m pixels are formed along the lateral direction of the glass substrate 7. Accordingly, n×m pixels 9 are formed on the glass substrate 7. Furthermore, a pixel electrode 11, an auxiliary capacitance element 12 which is a pixel auxiliary capacitance element as an accumulating capacitance element forming an auxiliary capacitor CS, and a thin film transistor 13 as a switching element are arranged in conformity with each pixel 9 in one-to-one correspondence.

Also, in the display frame portion 8, a plurality of (m) scanning lines 15 which are gate electrode wirings as electrode wirings are arranged on the surface of the glass substrate 7 along the width direction of the glass substrate 7 (the line direction of the pixel electrodes 11). These scanning lines 15 are spaced from one another parallel at an equal interval in the longitudinal direction of the glass substrate 7. Also, in the display frame portion 8, a plurality of (n) signal lines 16 which are image signal wirings as electrode wirings are arranged along the longitudinal direction of the glass substrate 7 (the column direction of the pixel electrodes 11) between the respective scanning lines 15. These signal lines 16 are spaced from one another parallel at an equal interval in the lateral direction of the glass substrate 7.

Accordingly, the scanning lines 15 and the signal lines 16 cross each other on the glass substrate and are wired in a matrix form as a grid form. In connection with each intersection point of each scanning line 15 with each signal line 16, the pixel electrode 11, the auxiliary capacitance element 12 and the thin film transistor 13 are provided every pixel 9.

In addition, a slender rectangular flat plate type Y driver circuit 18 as a signal line driving circuit including a driving TFT for driving the signal lines 16 is disposed in a peripheral area OA on the periphery of the display frame portion 8 of the glass substrate 7. The Y driver circuit 18 is provided to one side edge along the lateral direction of the glass substrate 7. Furthermore, the Y driver circuit 18 is provided along the longitudinal direction of the glass substrate 7, and one end portion of each scanning line 15 on the glass substrate 7 is electrically connected to the Y driver circuit 18. Also, a slender rectangular flat plate type X driver circuit 19 as a scanning line driving circuit including a driving TFT for driving the scanning lines 15 is disposed at one end along the longitudinal direction of a peripheral area OA on the periphery of the display frame portion 8 of the glass substrate 7. The X driver circuit 19 is provided along the lateral direction of the glass substrate 7, and one end portion of each signal line 16 on the glass substrate 7 is electrically connected to the X driver circuit 19. Regarding Y driver circuit 18 and the X driver circuit 19, a pixel signal is supplied to each signal line 16 from the X driver circuit 19 in synchronicity with the timing of turn-on/off of the thin film transistor 13 on the basis of a scanning signal supplied from the Y driver circuit 18 to each scanning line 15, thereby displaying a predetermined image on the display frame portion 8 of the array substrate 2. Also, the driving TFTs contained in the Y driver circuit 18 and the X driver circuit 19 are constructed by a n-channel type thin film transistor and a p-channel type thin film transistor which have polysilicon semiconductor layers.

Furthermore, an under-coat layer (under-coating layer) (not shown) formed of silicon nitride film, silicon oxide film or the like is laminated to form a film on the surface of the glass substrate 7. A top gate type thin film transistor 13 having a top gate type structure is disposed as one-pixel constituent element on the under-coat layer. That is, the thin film transistor 13 serves as a switching element and also as a pixel TFT element as a semiconductor element, and n×m thin film transistors 13 are disposed in the display frame portion 8. Each thin film transistor 13 is equipped with a source electrode 21 and a drain electrode 22 formed on the under-coat layer. The source electrode 21 and the drain electrode 22 are provided so as to be electrically insulated from each other via a predetermined gap. The signal line 16 is electrically connected to the source electrode 21, and the auxiliary capacitance element 12 is electrically connected to the drain electrode 22.

Furthermore, an active layer 23 as a semiconductor layer is provided between the source electrode 21 and the drain electrode 22. The active layer 23 is provided on the under-coat layer including the source electrode 21 and the drain electrode 22. The active layer 23 is a polysilicon semiconductor layer as a polycrystalline semiconductor layer formed of polysilicon (p-Si) as a polycrystalline semiconductor. That is, the active layer 23 is an island-shaped polysilicon thin film formed by subjecting amorphous silicon (a-Si) as an amorphous semiconductor to annealing which corresponds to dissolution and crystallization by an excimer laser and then patterning.

A gate electrode 24 having electrical conductivity is laminated to form a film on the active layer 23. The gate electrode 24 is integrally connected to one side edge of the scanning line 15, and constitutes a part of the scanning line 15. Here, the gate electrode 24 has a longitudinal direction perpendicular to the longitudinal direction of the active layer 23. The gate electrode 24 has a width dimension smaller than that of the active layer 23, and it is provided at the center portion on the active layer 23.

A transparent insulating film T of about 3.0 μm is formed at the portion corresponding to the display frame portion 8 on the under-coat layer. A contact hole HA having a size of 20×20 μm in the top view is formed in the transparent insulating film T so that the drain electrode 22 of the thin film transistor 13 is opened. A transparent pixel electrode 11 as pixel ITO (Indium Tin Oxide) is laminated on the transparent insulating film T including the contact hole HA. The pixel electrode 11 is provided so as to be adjacent to the portion where the thin film transistor 13 on the under-coat layer is provided, and it is electrically connected to the drain electrode 22 of the thin film transistor 13 concerned. That is, the pixel electrode 11 is provided in connection with each of the pixels 9 arranged in a matrix form in the display frame portion 8, and controlled by the thin film transistor 13 whose drain electrode 22 is electrically connected to the pixel electrode 11. The pixel electrode 11 is electrically connected to the auxiliary capacitance electrode 12a of the auxiliary capacitance element 12, and it is set to the same potential as the source electrode 21 of the thin film transistor 13 and the auxiliary capacitance electrode 12a of the auxiliary capacitance element 12. Here, the auxiliary capacitance electrode 12a of the auxiliary capacitance element 12 is formed of polysilicon film doped with impurities. The auxiliary capacitance line 12b of the auxiliary capacitance element 12 is set to a predetermined potential.

Also, a spacer 25 as a slender cylindrical pillar-shaped spacer having a longitudinal direction along the thickness direction of the array substrate 2 is projectingly provided between the pixel electrode 11 of any pixel 9 of the display frame portion 8 of the array substrate 2 and the source electrode 21 of the thin film transistor 13. These spacers 25 are provided to pixels 9 which are located so as to be spaced from one another via a predetermined number of, for example, three pixels 9 in the longitudinal and lateral directions of the display frame portion 8. That is, these spacers 25 are provided on the display frame portion 8 of the array substrate 2 so as to be spaced from one another at equal intervals. Furthermore, the orientation film (not shown) is laminated on the whole surface of the under-coat layer including these spacers 25, the pixel electrodes 11 and the thin film transistors 13.

The counter substrate 3 is equipped with a glass substrate 32 which is a light transmissible substrate as a substantially transparent rectangular flat plate type insulating substrate, that is, a translucent substrate. A color filter layer 33 is laminated on the surface corresponding to one principal surface of the glass substrate 32 which faces the array substrate 2. The color filter layers 33 are provided so as to project from the surface of the glass substrate 32.

Specifically, in the color filter layer 33, one set of color units including at least two colors, for example, three dots of a red color filter portion 34 corresponding to a colored layer of red (R), a green color filter portion 35 corresponding to a colored layer of green (G) and a blue color filter portion 36 corresponding to a colored layer of blue (B) are repeatedly arranged in each of the longitudinal direction and the lateral direction of the counter substrate 3.

Here, the red color filter portion 34 is formed of an ultraviolet curable acrylic resin resist as colored resin which is achieved by dispersing red pigments and transmits therethrough a red component light, for example, CRY-S623C (produced by FUJIFILM Electronic Materials Co., Ltd.). The green color filter portion 35 is formed of an ultraviolet curable acrylic resin resist as colored resin which is achieved by dispersing green pigments and transmits therethrough a green component light, for example, CGY-S624D (produced by FUJIFILM Electronic Materials Co., Ltd.). Furthermore, the blue color filter portion 36 is formed of an ultraviolet curable acrylic resin resist as colored resin which is achieved by dispersing blue pigments and transmits therethrough a blue component light, for example, CBY-S625C (produced by FUJIFILM Electronic Materials Co., Ltd.). In this case, the red color filter portion 34, the green color filter portion 35 and the blue color filter portion 36 are respectively formed at an equal thickness of 2.0 μm.

The color filter layer 33 including these red color filter portion 34, green color filter portion 35 and blue color filter portion 36 is provided so as to face the respective corresponding color pixels 9 of the array substrate 2 when the counter substrate 3 faces the array substrate 2. Furthermore, a rectangular flat plate type counter electrode 37 as a common electrode is laminated on the surface of the color filter layer 33 in the display frame portion 8. The counter electrode 37 is constructed by a light transmissible conductive member such as ITO film or the like as a transparent electrode. The counter electrode 37 is designed as a large rectangular electrode so that when the surface of the counter substrate 3 faces the surface of the array substrate 2, it is arranged commonly to all the pixels 9 over the whole display frame portion 8 of the glass substrate 7 of the array substrate 2 so as to face all the pixel electrodes 11 of n×m via the liquid crystal layer 4. In other words, the counter electrode 37 is arranged so as to become face-to-face with the pixel electrode 11 of the array substrate 2 when the counter substrate 3 faces the array substrate 2.

Furthermore, a bank pattern 38 corresponding to a partition wall serving as a bank-shaped dam pattern covering the peripheral edge of the color filter layer 33 provided on the glass substrate 32 is laminated on the glass substrate 32 of the counter substrate 3. The bank pattern 38 is provided at the position spaced from the outermost peripheral portion of the color filter layer 33 at a predetermined distance. That is, the bank pattern 38 continuously surrounds, via a predetermined space, a light shielded area 39 formed in a frame shape on the outer periphery of the display frame portion 8 corresponding to the surrounding of the color filter layer 33 except for a liquid crystal injection port 40.

Furthermore, the bank pattern 38 is projected from the surface of the glass substrate 32 so that the height thereof is substantially equal to the height of the color filter layer 33. Accordingly, the bank pattern 38 forms a bank A as a groove portion which is a gap having a U-shaped section is formed between the bank pattern 38 and the peripheral edge portion of the color filter layer 33. That is, when liquid light shielding ink C is coated into the bank A between the bank pattern 38 and the color filter layer 33, the bank pattern 38 functions as a frame for damming the light shielding ink C, and prevents avalanche of the light shielding ink C to the outside of the color filter layer 33.

Furthermore, the bank pattern 38 is formed of the same material as the colored layer located at the outermost side of the color filter layer 33, for example, the blue color filter member 36, and also formed in the same step as the blue filter portion 36 simultaneously. That is, the bank pattern 38 is formed of the same material as any one of the red color filter portion 34, the green color filter portion 35 and the blue color filter portion 36 of the color filter layer 33.

Also, the light shielding layer 41 as the frame-shaped frame portion formed by injecting the liquid light shielding ink C is formed in the bank A having the U-shaped section formed on the glass substrate 32 between the bank pattern 38 and the color filter layer 33. The light shielding layer 41 light-shields the light shielded area 39, and it is provided by coating the liquid light shielding ink C with ink jetting or a dispenser. Here, resin added with black pigment or the like may be used as the light shielding ink C. Furthermore, the light shielding ink C may be properly blended with solvent to enhance the coating performance. Accordingly, the light shielding layer 41 has a smaller thickness than the thickness of the color filter layer 33 in order to prevent leakage of the liquid light shielding material from the bank A between the bank pattern 38 and the peripheral edge of the color filter layer 33 before it is cured. Also, the light shielding portion 42 disposed in the light shielded area 39 so as to surround the outer periphery of the display frame portion 8 in the peripheral area OA is constructed by the light shielding layer 41 and the bank pattern 38. Furthermore, orientation film (not shown) is laminated on the whole surface of the glass substrate 32 including each of the light shielding layer 41, the bank pattern 38 and the counter-electrode 37.

The counter substrate 3 is secured to the array substrate 2 under the state that the counter electrode 37 side of the counter substrate 3 faces the pixel electrode 11 side of the array substrate 2. That is, the counter substrate 3 is secured to the array substrate 2 so as to be spaced from the array substrate 2 parallel so that each spacer 25 provided to the array substrate 2 abuts on the counter electrode 37 of the counter substrate 3 and a liquid sealing area B which is a predetermined space is formed between the array substrate 2 and the counter substrate 3.

The liquid crystal layer 4 is an optical modulation layer which is formed by injecting a liquid crystal composition 43 having positive dielectric anisotropy as liquid crystal material between the orientation film of the counter substrate 3 and the orientation film of the array substrate 2 so that the liquid crystal composition 43 is sandwiched therebetween. That is, the liquid crystal layer 4 is constructed by interposing and sealing the liquid crystal composition 43 via the liquid crystal injection port 40 between the orientation film of the counter substrate 3 and the orientation film of the array substrate 2. Furthermore, the liquid crystal layer 4 forms liquid crystal capacitance CL electrically-parallel to the auxiliary capacitance CS of the auxiliary capacitance element 12 between the pixel electrode 11 of the array substrate 2 and the counter electrode 37 of the counter substrate 3.

The seal material 5 is a liquid crystal sealing portion for sealing the liquid crystal layer 4 in the liquid crystal sealed area B between the array substrate 2 and the counter substrate 3 at the peripheral edge portion between the array substrate 2 and the counter substrate 3. The seal material 5 is adhesively fixed between the array substrate 2 and the counter substrate 3. Also, the seal material 5 is provided so as to cover the peripheral edge of the display frame portion 8 of the array substrate 2, and the liquid crystal sealed area B is formed between the display frame portion 8 of the array substrate 2 and the counter substrate 3. The seal material 5 is provided between the bank pattern 38 and the light shielding layer 41 of the counter substrate 3 and the outside portion of the glass substrate 7 of the array substrate 2 at the outer side from the display frame portion 8.

Furthermore, an electrode transfer material (not shown) for applying a voltage to the counter electrode 37 from the array substrate 2 is formed around the seal material 5. The electrode transfer material is formed on an electrode transfer electrode (not shown) provided at the display frame peripheral portion (not shown) between the array substrate 2 and the counter substrate 3.

Substantially rectangular flat plate type polarizing plates 44 and 45 are laminated to be secured on the back surface, that is, the outer surface of the glass substrate 7 of the array substrate 2 and on the back surface, that is, the outer surface of the glass substrate 32 of the counter substrate 3, respectively. These polarizing plates 44 and 45 cover substantially the whole surface of the back surface of the glass substrate 7 of the array substrate 2 and substantially the whole surface of the back surface of the glass substrate 32 of the counter substrate 3.

Next, a method of producing the liquid crystal display device according to the first embodiment will be described.

First, by repeating the film forming step and the patterning step, the pixel electrodes 11, the auxiliary capacitance elements 12, the thin film transistors 13, the scanning lines 15 and the signal lines 16 are formed in the display frame portion 8 on the glass substrate 7 to manufacture the array substrate 2.

Next, ultraviolet curable acrylic resin resist dispersed with red pigment, for example, CRY-S623C (produced FUJIFILM Electronic Materials Co., Ltd.) is coated on the glass substrate 32 by a spinner (not shown), and then a resist mask (not shown) is formed so that light is irradiated to a portion to be colored red on the glass substrate 32.

Thereafter, ultraviolet light of, for example, 365 nm in wavelength and 100 mJ/cm$^2$ is irradiated onto the glass substrate 32 via the resist mask and a pixel pattern is formed by photolithography. Thereafter, the result is developed for 20 seconds with 1% water solution of potassium hydroxide (KOH) containing an interfacial active agent to form the red color filter portion 34 of 2.0 μm in thickness.

Furthermore, photolithography is carried out as in the case of formation of the red color filter portion 34, and the green filter portion 35 of 2.0 μm in thickness is formed by using, for example, CGY-S624D (FUJIFILM Electronic Materials Co., Ltd.). In addition, the blue color filter portion 36 of 2.0 μm in thickness is formed by using, for example, CBY-S625C (FUJIFILM Electronic Materials Co., Ltd.), whereby the color filter layer 33 is formed in the display area of the glass substrate 32.

Figure 5:
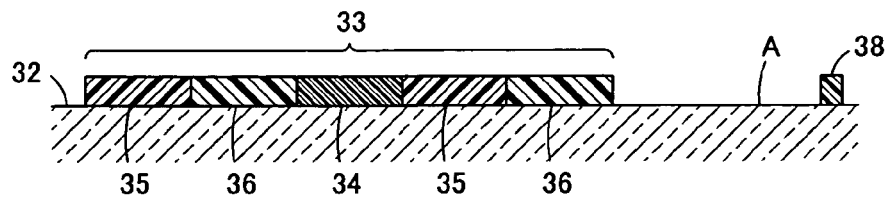
FIG. 5 is a diagram showing a state that a dam pattern is formed on a light transmissible substrate of the liquid crystal display device.

At this time, in the step of forming the blue color filter portion 36, as shown in FIG. 5, the bank pattern 38 is simultaneously formed at the outside of the color filter layer 33 on the glass substrate 32 by using the ultraviolet curable acrylic resin resist used when the blue color filter portion 36 is formed.

Figure 6:
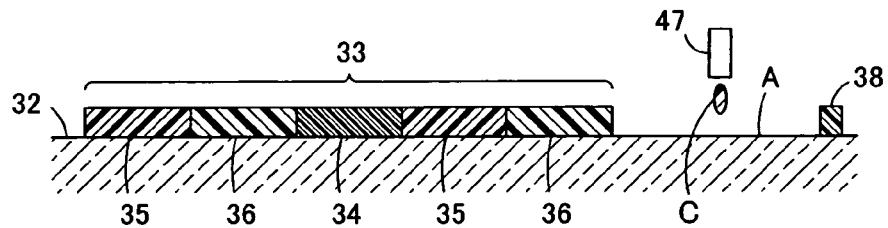
FIG. 6 is a diagram showing a state that light shielding material is coated between the dam pattern and a color filter layer.
Figure 7:
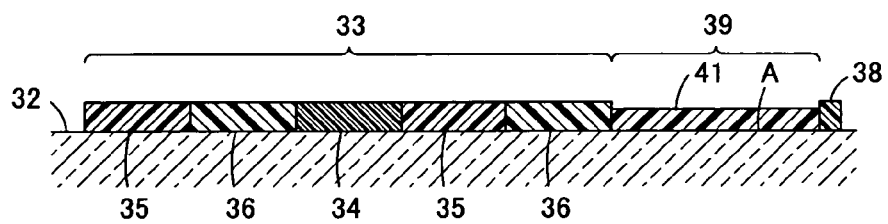
FIG. 7 is a diagram showing a state that a light shielding layer is formed between the dam pattern and the color filter layer.

Thereafter, as shown in FIG. 6, the light shielding ink C as the light shielding material corresponding to the black-pigment added resin having light shielding resin dispersed with black pigment in solution containing solvent, acrylic monomer or the like is coated in the bank A between the bank pattern 38 and the color filter layer 33 by coating means 47 such as an ink jet nozzle or a dispenser, and the light shielding layer 41 of 1.8 μm in thickness functioning as a light shielding layer is formed in the bank A between the bank pattern 38 and the color filter layer 33 as shown in FIG. 7, thereby manufacturing the color filter substrate having the frame.

Subsequently, ITO film of 500 ml$^{-10}$ (Å) is formed on the color filter layer 33 by the sputtering method, and then subjected to patterning to form the counter electrode 37.

Furthermore, photosensitive acrylic transparent resin, for example, NN600 (produced by JSR Corporation) is coated on the array substrate 2 by a spinner and dried for 10 minutes at 90° C., and then the result is exposed to light having an exposure amount of 80 mJ/cm$^2$ and a wavelength of 365 nm via the photomask (not shown).

Thereafter, the array substrate 2 is developed with alkaline water solution of pH 11.5, and then baked at 200° C. for 60 minutes, thereby forming the spacer 25 of 5.2 μm in height on the array substrate 2.

Subsequently, AL-3046 (produced by JSR Corporation) is coated as an orientation film material at a thickness of 800 m$^{-10}$ (Å) on each of the whole surfaces of the array substrate 2 on which the spacers 25 are formed and the counter substrate 3, and orientation film (not shown) is formed on each of the array substrate 2 and the counter substrate 3.

Thereafter, adhesive agent serving as the seal material 5 is printed along the peripheral edge of the orientation film of the counter substrate 3 excluding the portion in which the liquid crystal composition 43 is injected, and then the electrode transfer material (not shown) for applying a voltage from the array substrate 2 to the counter electrode 37 is formed on the electrode transfer electrode (not shown) on the periphery of the adhesive agent.

Subsequently, the orientation film of the array substrate 2 and the orientation film of the counter substrate 3 are disposed so as to face each other, and then heated to cure the adhesive agent and making it the seal material 5, whereby the array substrate 2 and the counter substrate 3 are attached to each other by the seal material 5.

Thereafter, a portion between the array substrate 2 and the counter substrate 3 which is not sealed by the seal material 5 serves as an injection port, and ZLI-1565 (produced by Merck Ltd., Japan), for example, is injected as the liquid crystal composition 43 having positive dielectric anisotropy from the injection port, so that the liquid crystal composition 43 is interposed in the liquid crystal sealed area B between the array substrate 2 and the counter substrate 3.

Under this state, the injection port between the array substrate 2 and the counter substrate 3 is sealed by using ultraviolet curable resin as a sealing agent, thereby manufacturing the liquid crystal panel 1 that can perform color display.

Thereafter, the lighting evaluation of the liquid crystal panel 1 is carried out. As a result, the liquid crystal panel 1 has excellent display quality and also the light shielding performance of the light shielding layer 41 can be sufficiently secured.

As described above, according to the first embodiment, when the color filter layer 33 is manufactured on the glass substrate 32 of the counter substrate 3, the bank pattern 38 is simultaneously formed at the outside of the color filter layer 33 on the glass substrate 32 by using the ultraviolet curable acrylic resin resist used when any one of the red color filter portion 34, the green color filter portion 35 and the blue color filter portion 36 constituting the color filter layer 33 is formed. Thereafter, the light shielding ink C is coated in the bank A between the bank pattern 38 and the peripheral edge of the color filter layer 33, and the light shielding layer 41 is formed in the bank A between the bank pattern 38 and the peripheral edge of the color filter layer 33.

As a result, as compared with the case where two-staged bank patterns 38 are formed separately from the color filter layer 33 and light shielding ink C is coated between these bank patterns 38 to form the light shielding layer, the light shielding layer 41 can be formed continuously at the peripheral edge of the color filter layer 33. Therefore, it becomes less likely that the light shielding layer 41 is overlapped with the inside of the display frame portion 8 or intrudes into the display frame portion 8, so that the aperture ratio of the liquid crystal panel 1 becomes less likely to be reduced. Accordingly, the liquid panel 1 having a large aperture ratio can be achieved.

Also, as compared with a case where the light shielding layer 41 is formed separately from the color filter layer by using the photolithography requiring a large number of processing steps such as coating, light exposure, development, baking, etc., the number of manufacturing steps of the light shielding layer 41 can be reduced, and thus, the color filter layer 33 and the light shielding layer 41 can be easily manufactured. Accordingly, the manufacturing cost of the liquid crystal panel 1 can be reduced, and also excellent display quality and light shielding performance of the light shielding layer 41 can be sufficiently secured through lighting evaluation, so that the liquid crystal panel 1 having high display quality can be provided at low price.

In the above-described first embodiment, the same material as any one of the red color filter portion 34, the green color filter portion 35 and the blue color filter portion 36 located at the outermost peripheral edge of the color filter layer 33 is laminated on the glass substrate 32 at the outer side from the peripheral edge of the color filter layer 33 to form the bank pattern 38. However, when the red color filter portion 34, the green color filter portion 35 and the blue color filter portion 36 are successively formed, the same materials as these color filter portions may be laminated in a multi-layer structure in accordance with the cell gap between the array substrate 2 and the counter substrate 3 to form the bank pattern 38 as in the case of the second embodiment shown in FIG. 8.

Figure 8:
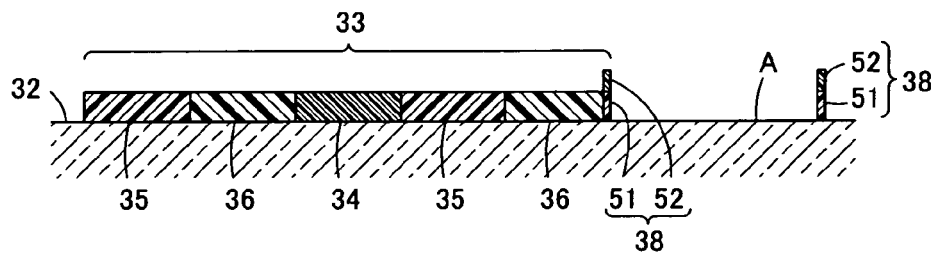
FIG. 8 is a diagram showing a state that a dam pattern is formed on a light transmissible substrate of a second embodiment of the liquid crystal display device of the present invention.

That is, as shown in FIG. 8, the red color filter portion 34 is formed on the glass substrate 32. At this time, lower layer patterns 51 are formed of the same material as the red color filter portion 34 at a position outwardly-continuous with the peripheral edge of the color filter layer 33 and also at a position outwardly-spaced by a predetermined distance from the peripheral edge of the color filter layer 33, respectively.

Thereafter, the green color filter portion 35 is formed so as to be adjacent to the red color filter portion 34, and then the blue color filter portion 36 is formed between the green color filter portion 35 and the red color filter portion 34. At this time, the same material as the blue color filter portion 36 is laminated on the lower layer pattern 51 to form an upper pattern 52, whereby the bank pattern 38 having a laminate structure of 3.5 μm in thickness is formed by the lower layer pattern 51 and the upper layer pattern 52.

Figure 9:
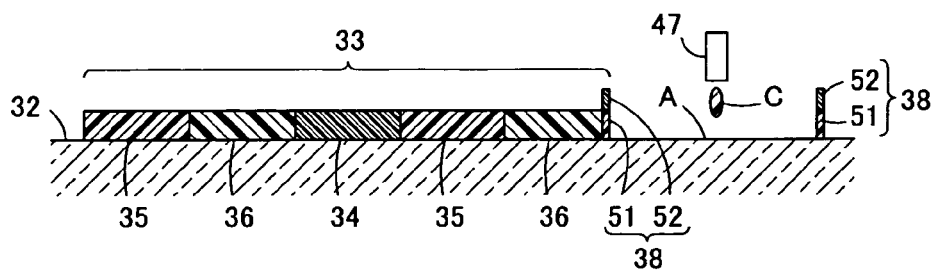
FIG. 9 is a diagram showing a state that light shielding material is coated between the dam pattern and the color filter layer.
Figure 10:
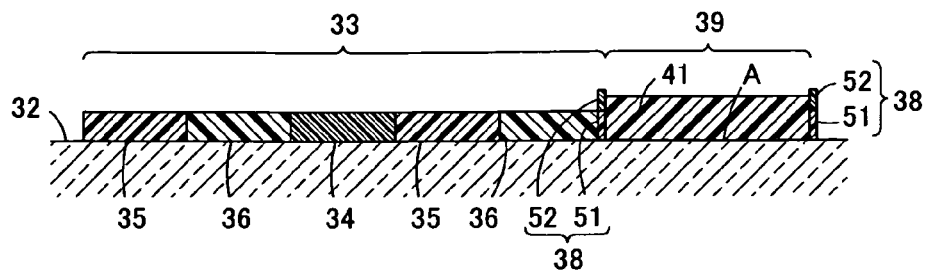
FIG. 10 is a diagram showing a state that the light shielding layer is formed between the dam pattern and the color filter layer.

Subsequently, as shown in FIG. 9, the light shielding ink C is coated in the bank A between these bank patterns 38, and as shown in FIG. 10, the light shielding layer 41 of 3 μm which is larger in thickness than the color filter layer 33 is formed in the gap between the bank patterns 38, thereby manufacturing a color filter substrate having a frame.

As a result, the same material as the red color filter portion 34 is laminated on the glass substrate 32 in the same step to form the lower layer pattern 51, and the same material as the blue color filter portion 36 is laminated on the lower layer pattern 51 in the same step to form the upper layer pattern 52, thereby forming the bank patterns 38, so that the height dimension of the bank patterns 38 are set to be larger than the thickness dimension of the color filter layer 33, and thus, the thickness of the light shielding layer 41 coated between the bank patterns 38 can be set to be larger than the thickness of the color filter layer 33. Therefore, the light shielding performance of the light shielding layer 41 can be enhanced.

Furthermore, the light shielding layer 41 can be set to be large in thickness, and the addition amount of the black pigment in the light shielding ink C coated as the light shielding layer 41 can be reduced, so that the viscosity of the light shielding ink C can be reduced. Accordingly, although it is not easy to coat light shielding ink C having high viscosity by the coating means 47 such as an ink jet or dispenser, the viscosity of this light shielding ink C can be set properly for the coating means 47 such as an ink jet or dispenser, so that the light shielding layer 41 can be efficiently manufactured by the coating means 47. Also, it has been found through the lighting evaluation that the black of the light shielding layer 41 becomes still darker and firmer than in the liquid crystal panel 1 of the first embodiment and thus, the liquid crystal panel 1 can be designed to have higher-grade image quality.

Figure 11:
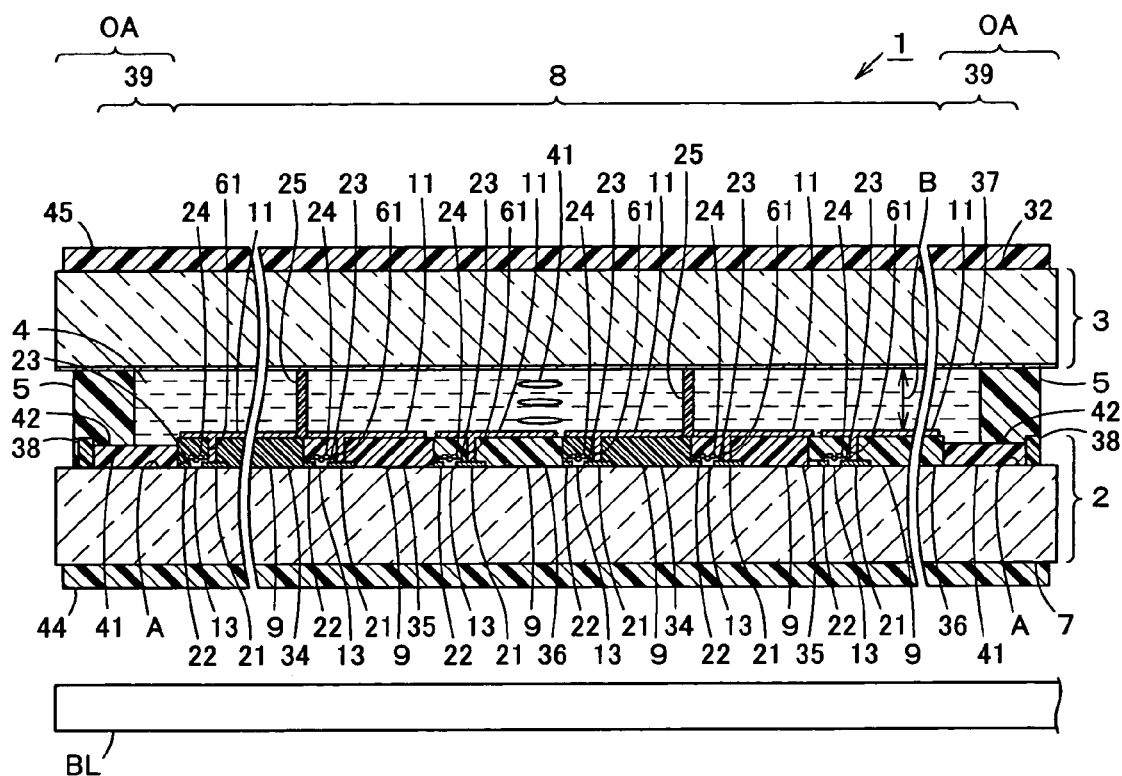
FIG. 11 is a cross sectional view showing a third embodiment of the liquid crystal display device of the present invention.

Also, as in the case of a third embodiment shown in FIG. 11, the color filter layer 33 maybe formed on the array substrate 2. The color filter layer 33 is laminated on an under-coat layer including a thin film transistor 13. Contact holes 61 which are achieved by opening the drain electrodes 22 of the thin film transistors 13 provided so as to face the red color filter portion 34, the green color filter portion 35 and the blue color filter portion 36 of the color filter layer 33 are formed in the red color filter portion 34, the green color filter portion 35 and the blue color filter portion 36, respectively. Here, these contact holes 61 are formed in the dimension of 20 μm×20 μm in the top view. The pixel electrodes 11 are laminated on the red color filter portions 34, the green color filter portions 35 and the blue color filter portions 36 including these contact holes 61. The pixel electrode 11 is conductive and electrically connected to the drain electrode 22 of the thin film transistor 13 via the contact hole 61.

Furthermore, the spacer 25 is provided between the red color filter portion 34 and the green color filter portion 35. The spacer 25 is provided between the pixel electrode 11 on the red color filter portion 34 and the pixel electrode 11 on the green color filter portion 35 so that the pixel electrode 11 on the red color filter portion 34 and the pixel electrode 11 on the green color filter portion 35 are electrically insulated from each other. The bank pattern 38 is provided on the under-coat layer at the outer side from the peripheral edge of the color filter layer 33, and the light shielding ink C is coated in the bank A between the bank pattern 38 and the color filter layer 33 to form the light shielding layer 41.

In the counter substrate 3, the counter electrode 37 is laminated on the whole surface of the glass substrate 32, and the counter electrode 37 and each of the light shielding layer 41 and the bank pattern 38 of the array substrate 2 are connected to each other by the seal material 5.

As a result, when the color filter layer 33 is formed on the glass substrate 7 of the array substrate 2, the bank pattern 38 is formed, and the light shielding ink C is coated in the bank A between the bank pattern 38 and the color filter layer 33 to form the light shielding layer 41. Therefore, the same action and effect as the first embodiment can be achieved. Furthermore, by forming the color filter layer 33 at the array substrate 2 side, it is unnecessary to separately form the transparent insulating film and thus, the manufacturing cost can be reduced. A lighting evaluation is carried out on the liquid crystal panel 1 provided with the color filter layer 33 at the array substrate 2 side, so that high display quality can be achieved as in the case of the first embodiment.

Figure 12:
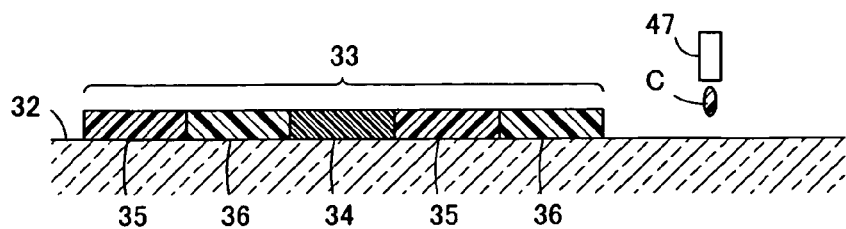
FIG. 12 is a diagram showing a state that light shielding material is coated at the outside of a color filter layer of a fourth embodiment of the liquid crystal display device of the present invention.
Figure 13:
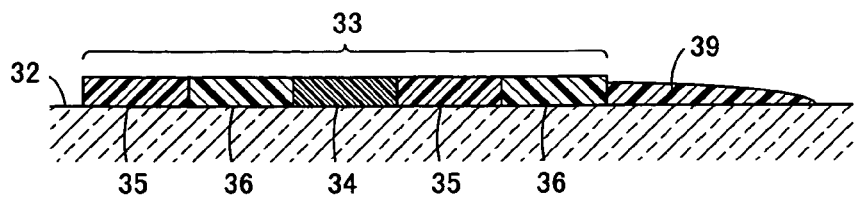
FIG. 13 is a diagram showing a state that the light shielding layer is formed at the outside of the color filter layer.

Furthermore, as in the case of a fourth embodiment shown in FIGS. 12 and 13, no bank pattern 38 is provided at the outer side from the peripheral edge of the color filter layer 33, and the light shielding ink C is coated at the peripheral edge of the color filter layer 33 as shown in FIG. 12 so that the light shielding layer 41 is formed so as to be continuous with the peripheral edge of the color filter layer 33 as shown in FIG. 13. That is, the outside of the light shielding layer 41 is not partitioned by the bank pattern 38, and thus, the light shielding layer 41 flows to the outside. Therefore, there is a risk that the pattern of the light shielding layer 41 may be broken. However, it is unnecessary to form the bank pattern 38 which may peel when it is formed, and thus, the manufacturing performance of the liquid crystal panel 1 can be enhanced.

In each of the above-described embodiments, the top gate type thin film transistor 13 has been described. However, a bottom gate type thin film transistor 13 having a bottom gate type structure or a coplanar type thin film transistor 13 may be used in connection with the foregoing description.

Furthermore, the peripheral driving circuits such as the Y driver circuit 18 and the X driver circuit 19 are prepared at the peripheral edge of the display frame portion 8 of the glass substrate 7 of the array substrate 2. However, the peripheral driving circuits such as the Y driver circuit 18 and the X driver circuit 19 may be formed separately from the array substrate 2 and then connected to the array substrate 2.

Next, a fifth embodiment will be described with reference to FIGS. 14 to 25. The same construction and action as each of the above-described embodiments are represented by the same reference numerals and the description thereof is omitted.

In the liquid crystal panel 1 of the fifth embodiment, the color filter layer 33 is provided to the array substrate 2 side. That is, the array substrate 2 is equipped with the color filter layer 33 formed so as to cover the thin film transistor 13 for every pixel 9 on the light-transmissible glass substrate 7, the pixel electrode 11 arranged for every pixel 9 on the color filter layer 33, the spacer 25 formed on the color filter 33, the orientation film 65 formed so as to cover the whole of a plurality of pixel electrodes 11, etc.

Each pixel electrode 11 is connected to the corresponding thin film transistor 13 via the through hole 67 penetrating through the color filter layer 33.

Figure 15:
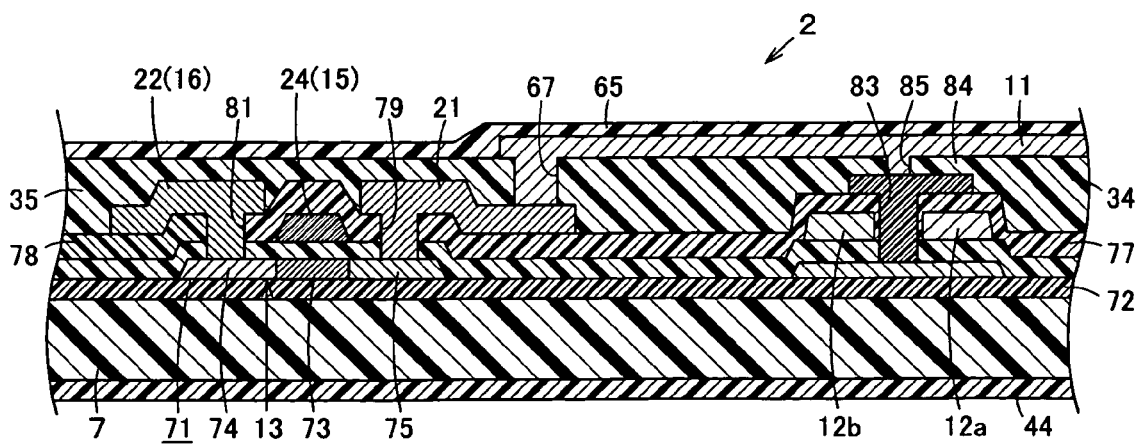
FIG. 15 is a cross-sectional view showing the structure of an array substrate of the liquid crystal display device.

Each thin film transistor 13 is an n-channel type coplanar type TFT having a polysilicon semiconductor layer, for example, and it has an active layer 71 as a semiconductor layer formed of polysilicon film. The detailed structure thereof is shown in FIG. 15. The active layer 71 is arranged on the under-coat layer 72 arranged on the glass substrate 7, and has a drain region 74 and a source region 75 which are formed by doping impurities to both the sides of a channel region 73.

The source electrode 21 of each thin film transistor 13 is electrically connected to the source region 75 of the active layer 71 via the contact hole 79 penetrating through gate insulating film 77 and inter-layer insulating film 78. The source electrode 21 is electrically connected to the pixel electrode 11 via a through hole 67 formed in the color filter layer 33 covering the inter-layer insulating film 78, the drain electrode 22 and the source electrode 21.

Also, the drain electrode 22 of each thin film transistor 13 is formed integrally with the signal line 16, and electrically connected to the drain region 74 of the active layer 71 via a contact hole 81 penetrating through the gate insulating film 77 and the inter-layer insulating film 78.

Furthermore, the gate electrode 24 of each thin film transistor 13 is formed integrally with the scanning line 15, and arranged so as to face the active layer 71 via the gate insulating film 77.

Accordingly, the thin film transistor 13 is connected to the scanning line 15 and the signal line 16, and it is conducted by a driving voltage from the scanning line 15 and applies a signal voltage from the signal line 16 to the pixel electrode 11.

The auxiliary capacitance electrode 12a of the auxiliary capacitance element 12 is arranged on the under-coat layer 72 which is the same layer as the active layer 71, and electrically connected to a contact electrode 84 via a contact hole 83 penetrating through the gate insulating film 77 and the inter-layer insulating film 78. The contact electrode 84 is electrically connected to the pixel electrode 11 via the contact hole 85 penetrating through the color filter layer 33, whereby the source electrode 21 of the thin film transistor 13, the pixel electrode 11 and the auxiliary capacitance electrode 12a are set to the same potential. Furthermore, at least a part of the auxiliary capacitance line 12b of the auxiliary capacitance element 12 is arranged so as to face the auxiliary capacitance electrode 12a via the gate insulating film 77 and set to a predetermined potential.

Figure 14:
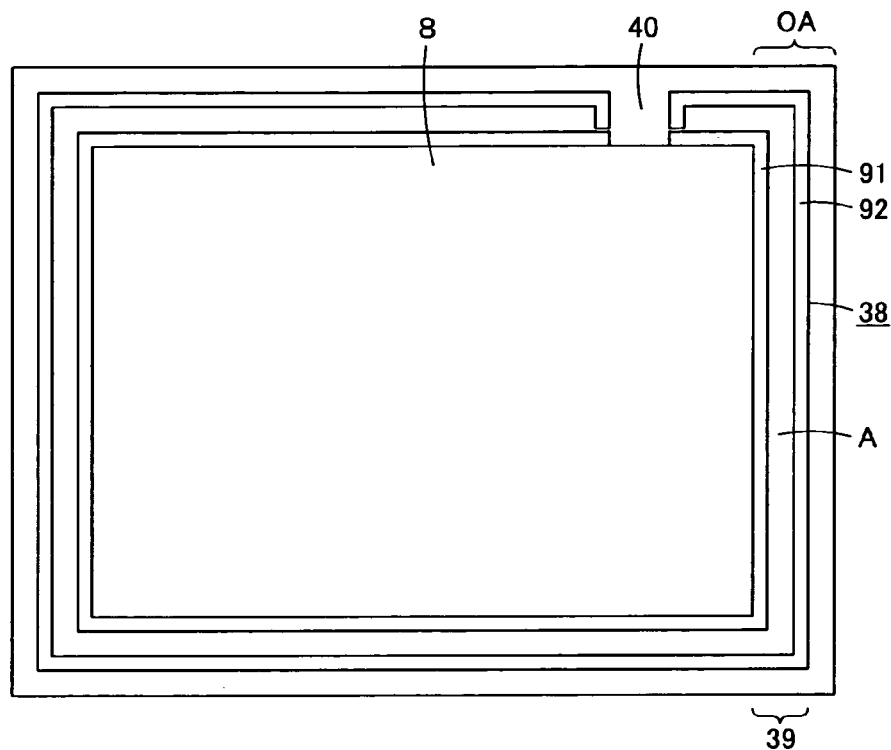
FIG. 14 is a plan view showing a fifth embodiment of the liquid crystal display device of the present invention.
Figure 16:
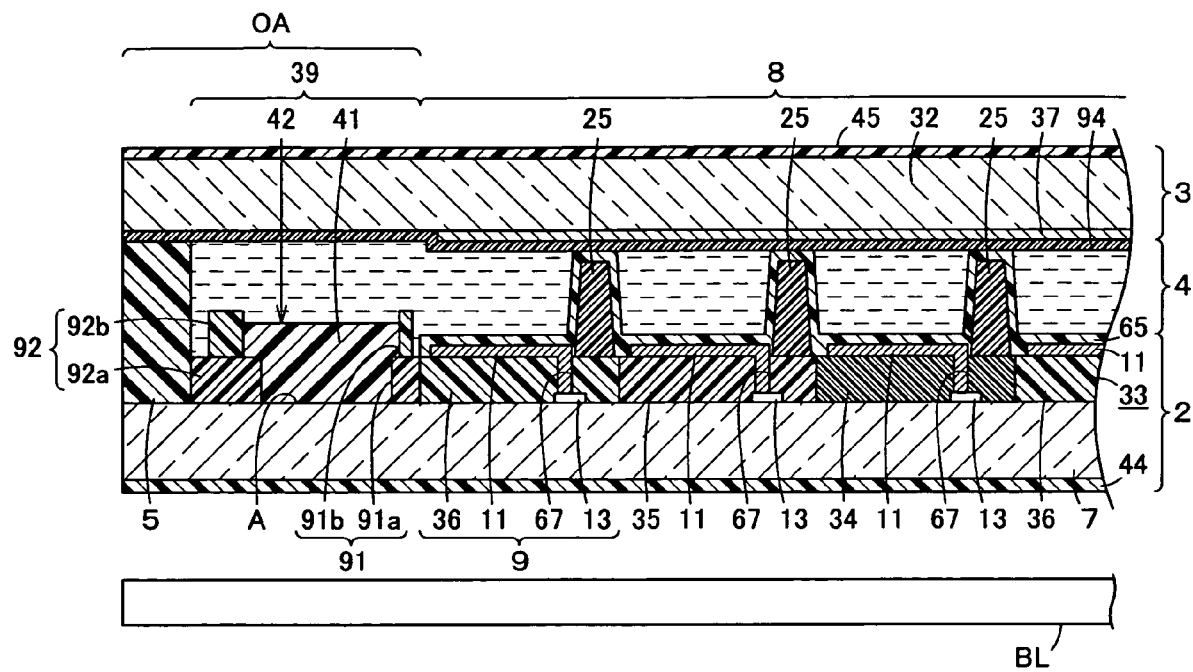
FIG. 16 is a cross-sectional view showing the liquid crystal display device.

As shown in FIGS. 14 to 16, the light shielding portion 42 is equipped with a pair of partition walls 91 and 92 corresponding to bank patterns as dam patterns achieved by laminating two layers of colored resin constituting the color filter layer 33, and the light shielding layer 41 disposed on the upper surface of the glass substrate 7 in the bank A formed between the pair of partition walls 91 and 92.

More specifically, in the pair of partition walls 91 and 92, the lower stage portions 91a and 92a constituting respective parts of the partition walls 91 and 92 and upper stage portions 91b and 92b constituting the other parts of the partition walls 91 and 92 are constructed by color resin of different colors (for example, the lower stage portions 91a and 92a are formed of colored resin of green, and the upper stage portions 91b and 92b are formed of colored resin of blue), and provided to the light shielded area 39 except for the liquid crystal injection port 40. A groove-shaped bank A surrounding the light shielded area 39 except for the liquid crystal injection port 40 is formed between the pair of partition walls 91 and 92, and the light shielding layer 41 formed of light shielding resin such as black color resin dispersed with black pigment is formed in the bank A.

The spacers 25 are formed of photosensitive resin, for example. The spacers 25 are arranged on the respective color filter portions 34, 35 and 36 of the color filter layer 33 laminated on the wiring portion having light shielding performance. The orientation film 65 orients liquid crystal molecules contained in the liquid crystal layer 4 in a predetermined direction with respect to the array substrate 2.

The counter substrate 3 has the counter electrode 37 formed on the glass substrate 32, orientation film 94 covering the counter electrode 37, etc. The orientation film 94 orients the liquid crystal molecules contained in the liquid crystal layer 4 in a predetermined direction with respect to the counter substrate 3.

Light emitted from a back light unit BL is passed through the polarizing plate 44 at the array substrate 2 side of the liquid crystal panel 1, modulated via the liquid crystal layer 4 and selectively transmitted by the polarizing plate 45 of the counter substrate 3 side, whereby an image is displayed on the display frame portion 8 of the liquid crystal panel 1.

Next, a method of producing the above-described liquid crystal panel 1 will be described.

Figure 17:
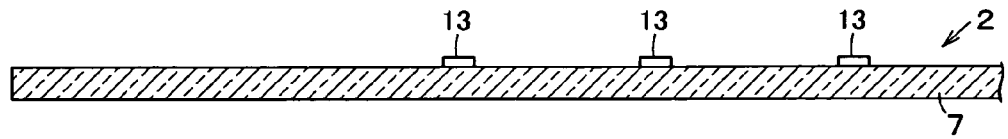
FIG. 17 is a diagram showing a state that a switching element is formed on the light transmissible substrate of the liquid crystal display device.

In the step of manufacturing the array substrate 2, first, the under-coat layer 72 is formed on the glass substrate 7, and then the active layer 71 of polysilicon of the thin film transistor 13, etc., and the auxiliary capacitance electrode 12a are formed. Subsequently, after the gate insulating film 77 is formed, various kinds of wirings such as the scanning line 15, the auxiliary capacitance line 12b, the gate electrode 24 integral with the scanning line 15, etc., are formed. Subsequently, impurities are doped into the active layer 71 of polysilicon by using the gate electrode 24 as a mask to form the drain region 74 and the source region 75, and then the whole substrate is annealed to activate the impurities. Subsequently, after the inter-layer insulating film 78 is formed, the respective contact holes 81, 79 and 83 are formed so as to penetrate through the gate insulating film 77 and the inter-layer insulating film 78. Subsequently, the signal line 16 is formed, and the drain electrode 22 of the thin film transistor 13, the source electrode 21 and the contact electrode 84 are formed so as to be integral with the signal line 16, thereby achieving the array substrate 2 in which the thin film transistors 13 as shown in FIG. 17 and the electrode wirings are formed.

Subsequently, each of the color filter portions 34, 35 and 36 of the color filter layer 33 is formed in connection with each color pixel 9, and the pair of partition walls 91 and 92 are formed in the light shielded area 39.

Figure 18:
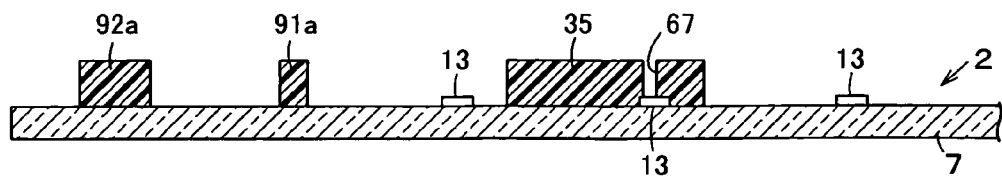
FIG. 18 is a diagram showing a state that a part of the color filter layer and a lower stage portion of a partition wall are formed on the light transmissible substrate.

More specifically, the ultraviolet curable acrylic resin resist dispersed with green pigment is coated on the whole surface of the substrate by a spinner. Then, the resist film is exposed to light having a wavelength of 365 nm with an exposure amount of 100 mJ/cm$^2$ via a photomask by which light is irradiated to the portions corresponding to the green pixels and the portions corresponding to the partition walls 91 and 92 at the peripheral edge of the display frame portion 8. Then, this resist film is developed for 10 seconds with 1% water solution of potassium hydroxide (KOH) containing an interfacial active agent, and then baked. Accordingly, the green filter portion 35 having a film thickness of 3.0 μm is formed, and the lower stage portions 91a and 92a of the partition walls 91 and 92 formed of acrylic resin dispersed with green pigment are formed as shown in FIG. 18.

Figure 19:
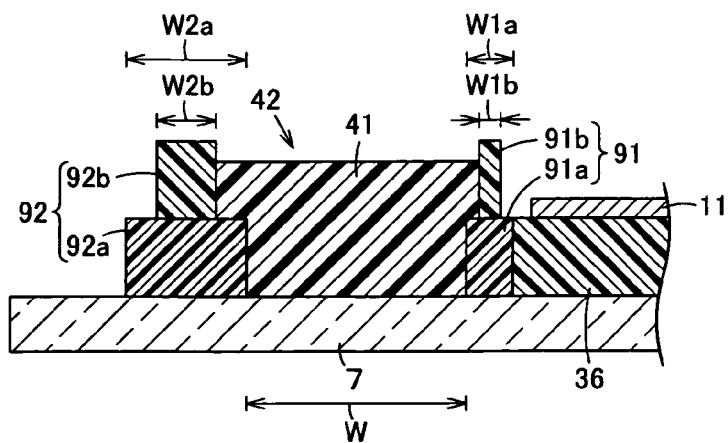
FIG. 19 is a diagram showing a state that the light shielding material coated between a pair of partition walls is cured.

The width dimension (line width) of the lower stage portions of the partition walls 91 and 92 are not limited to a specific value insofar as it is such a width dimension that the upper stage portions 91b and 92b of the partition walls 91 and 92 formed on the upper surfaces of the lower stage portions can be formed. For example, in this embodiment, as shown in FIG. 19, the width dimension W1a of the lower stage portion 91a of the partition wall 91 formed inside (that is, at the display frame portion 8 side) is set to 50 μm, and the width dimension W2a of the lower stage portion 92a of the partition wall 92 formed at the outer peripheral side of the partition wall 91 is set to 250 μm. The dimension W of the space between the lower stage portion 91a of the partition wall 91 and the lower stage portion 92a of the partition wall 92 may be properly set in accordance with the dimension of the light shielded area required in the liquid crystal panel 1 to be manufactured. In this embodiment, the dimension W is set to 2 mm, for example.

Figure 20:
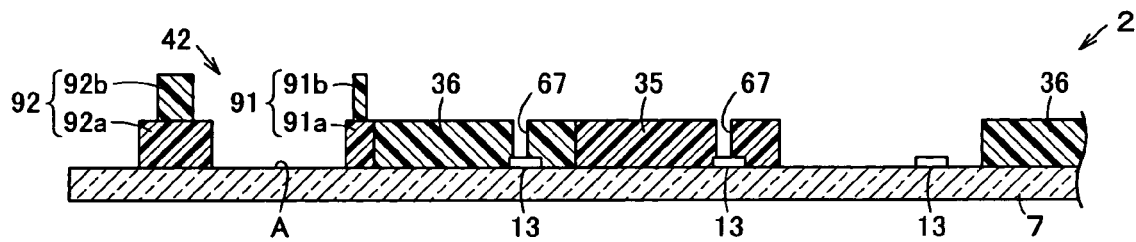
FIG. 20 is a diagram showing a state that another part of the color filter layer and an upper stage portion of the partition wall are formed on the light transmissible substrate.

Subsequently, by repeating the coating of the ultraviolet curable acrylic resin resist and the photolithography process, as shown in FIG. 20, the blue color filter portion 36 having a film thickness of 3.0 μm is formed and the upper stage portions 91b and 92b of the partition walls 91 and 92 formed of acrylic resin dispersed with blue pigment are formed on the upper surfaces of the lower stage portions 91a and 92a of the partition walls 91 and 92, whereby the groove-shaped bank A having a depth of 6.0 μm is formed in the light shielded area 39 between the partition walls 91 and 92.

The width dimension of the upper stage portions 91b and 92b of the partition walls 91 and 92 is not limited to a specific value in so far as the width dimension concerned is not less than the limit resolution (line width) at which the ultraviolet curable acrylic resin constituting the upper stage portions 91b and 92b can secure predetermined adhesion strength. For example, in this embodiment, as shown in FIG. 19, the width dimension W1b of the upper stage portion 91b of the partition wall 91 at the inside is set to 25 μm, and the width dimension W2b of the upper stage portion 92b of the partition wall 92 at the outer peripheral side is set to 100 μm.

Figure 21:
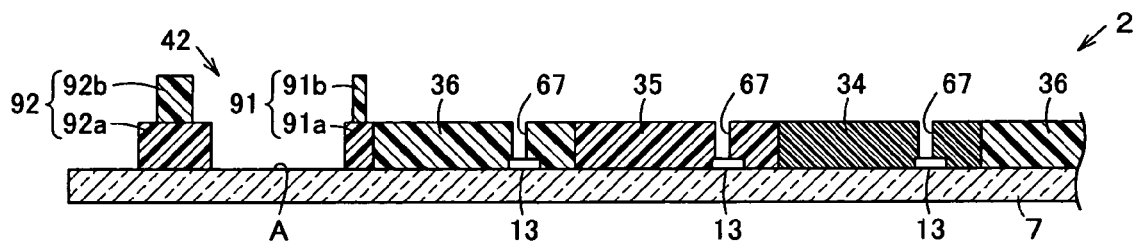
FIG. 21 is a diagram showing a state that still another part of the color filter layer is formed on the light transmissible substrate.

By repeating the same process, as shown in FIG. 21, the red color filter portion 34 having a film thickness of 3.0 μm formed of acrylic resin dispersed with red pigment is formed at the portion corresponding to each red pixel.

In the step of forming each of the color filter portions 34, 35 and 36, the through holes 67 and the contact holes 85 are simultaneously formed.

Figure 22:
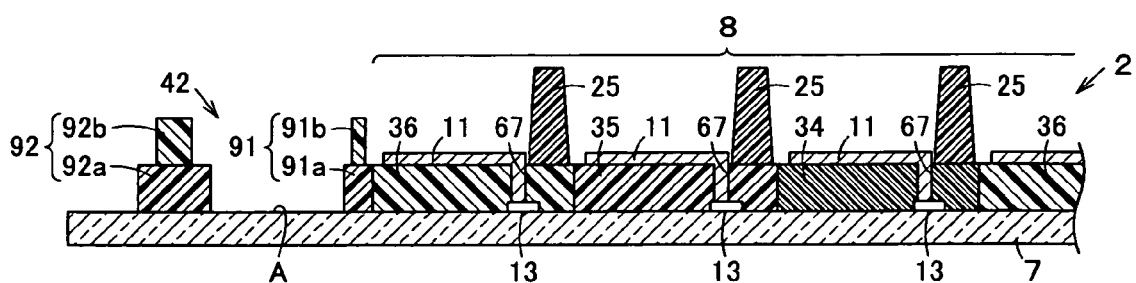
FIG. 22 is a diagram showing a state that pixel electrodes and spacers are formed on the color filter layer.

Subsequently, ITO is formed on the color filter layer 33 by the sputtering method, and patterned into a predetermined pixel pattern to form the pixel electrodes 11 coming into contact with the thin film transistors 13. Subsequently, ultraviolet curable acrylic resin resist, for example, is coated at a predetermined film thickness on the surface of the substrate by a spinner. After this resin material is heated and dried, the resin material is exposed to ultraviolet rays having a predetermined exposure amount by using a photomask having a predetermined pattern. The resin material is developed with alkaline water solution, and heated and baked for a predetermined time, whereby the spacers 25 of about 5 μm are formed at predetermined positions on the color filter layer 33 while avoiding the pixel electrodes 11 of the substrate surface as shown in FIG. 22.

Figure 23:
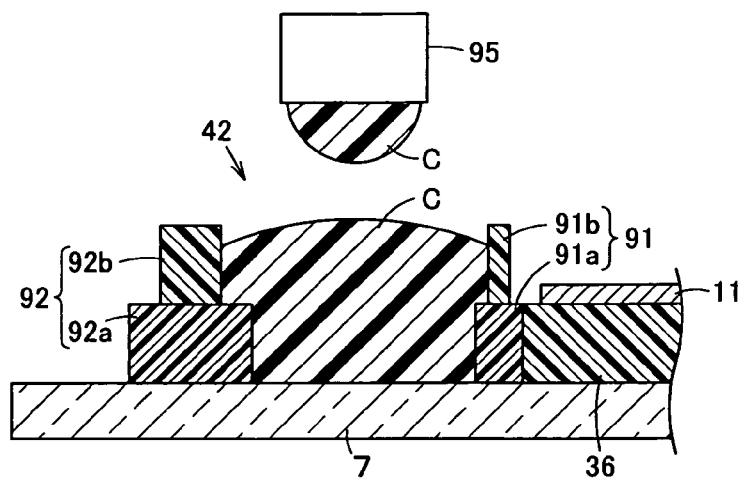
FIG. 23 is a diagram showing a state that the light shielding material is coated between a pair of partition walls.
Figure 24:
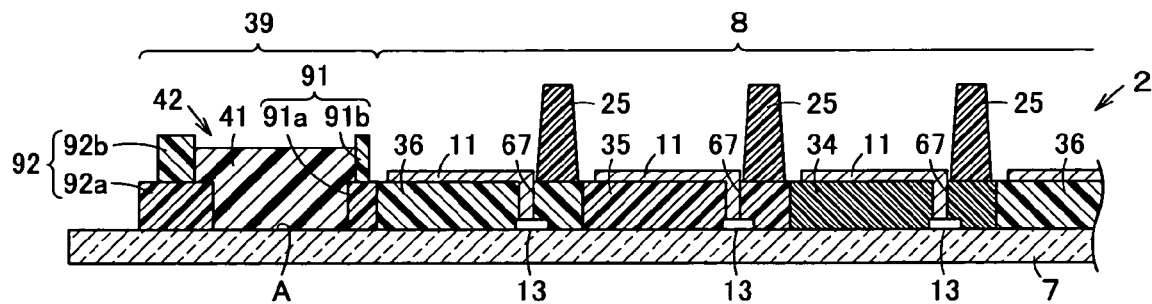
FIG. 24 is a diagram showing a state that the light shielding layer is formed between a pair of partition walls.

Subsequently, as shown in FIGS. 23 and 24, the light shielding ink C is dropped from an ink jet nozzle 95 into the bank A formed between the partition walls 91 and 92 to coat the light shielding ink C into the bank A. The acrylic monomer is cured by heating and baking to form the light shielding layer 41 formed of black resin in the bank A. In this embodiment, the light shielding ink C containing thermosetting resin which is cured by a heating treatment is used. However, in place thereof, light shielding ink containing photocurable resin which is cured by irradiation of light may be used.

Figure 25:
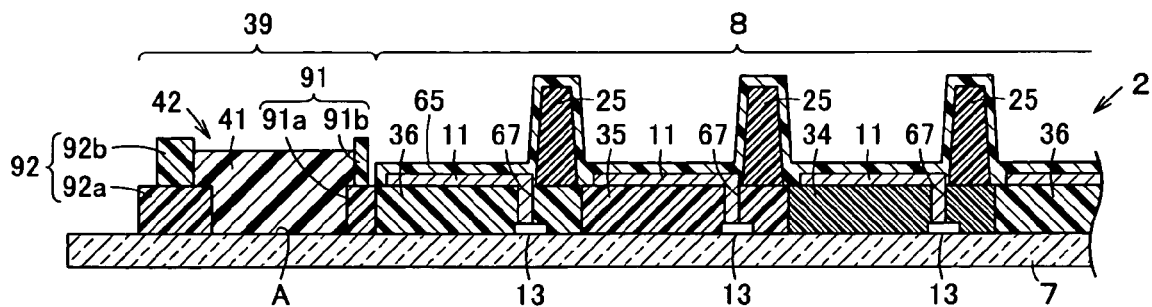
FIG. 25 is a diagram showing a state that orientation film is formed on the light transmissible substrate.

Subsequently, orientation film material AL-1051 (JSR Corporation) is coated on the whole surface of the substrate, and then subjected to a rubbing treatment to form the orientation film 65, thereby manufacturing the array substrate 2 as shown in FIG. 25.

In the step of manufacturing the counter substrate 3, first, ITO is formed at a thickness of about 150 nm by the sputtering method, and patterned to form the counter electrode 37. Thereafter, the same orientation film material as the orientation film 65 is coated on the counter electrode 37, and subjected to the rubbing treatment to form the orientation film 94, thereby manufacturing the counter substrate 3.

In the step of manufacturing the liquid crystal panel 1, the seal material 5 is printed and coated along the outer edge of the array substrate 2 except for the liquid crystal injection port 40 being left, and an electrode transfer material for applying a voltage from the array substrate 2 to the counter electrode 37 is formed on the electrode transfer electrode on the periphery of the seal material 5. Subsequently, the array substrate 2 and the counter substrate 3 are arranged so that the orientation film 65 of the array substrate 2 and the orientation film 94 of the counter substrate 3 face each other, and the seal material 5 is cured by heating so that both the substrates adhere to each other. Subsequently, liquid crystal composition such as ZLI-1565 (produced by Merck Ltd., Japan) or the like is injected from the liquid crystal injection port 40, and further the liquid crystal injection port 40 is sealed by the sealing member 93 to form the liquid crystal layer 4, thereby manufacturing the liquid crystal display panel.

As described above, according to the fifth embodiment, in the step of forming the color filter layer 33, the color filter layer 33 is formed in the display frame portion 8, and also the partition walls 91 and 92 forming the bank A for damming the light shielding ink C in the light shielded area 39 are formed. Therefore, the light shielding layer 41 can be formed at a predetermined position of the outer peripheral portion of the display frame portion 8 by the ink jet system without requiring another step and also without expansion of the light shielding ink C to the peripheral edge portion of the array substrate 2, whereby the use efficiency of raw materials can be enhanced and the manufacturing cost can be reduced.

Also, the light shielding layer 41 and the color filter layer 33 disposed at the outermost periphery of the display frame portion 8 (in this embodiment, the blue color filter portion 36) are not adjacent to each other, and thus, no color mixture occurs between both the layers.

In this embodiment, the lower stage portions 91a and 92a and upper stage portions 91b and 92b of the pair of partition walls 91 and 92 are formed of colored resin of green and colored resin of blue, respectively. However, the present invention is not limited to this embodiment, and they may be formed of colored resin of any color of the colors constituting the color filter portions 34, 35 and 36 of the color filter layer 33.

Figure 26:
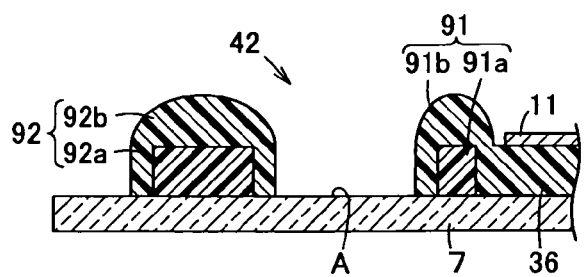
FIG. 26 is a diagram showing a sixth embodiment of the liquid crystal display device of the present invention.
Figure 27:
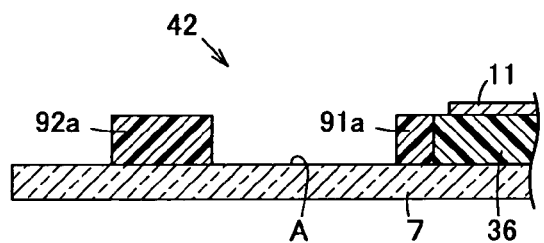
FIG. 27 is a diagram showing a state that the lower stage portion of the partition wall is formed on the light transmissible substrate of a seventh embodiment of the liquid crystal display device of the present invention.
Figure 28:
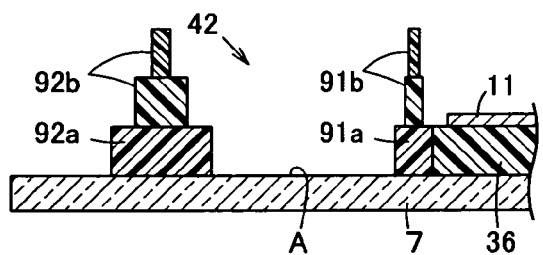
FIG. 28 is a diagram showing a state that the partition wall is formed on the light transmissible substrate of the liquid crystal display device.
Figure 29:
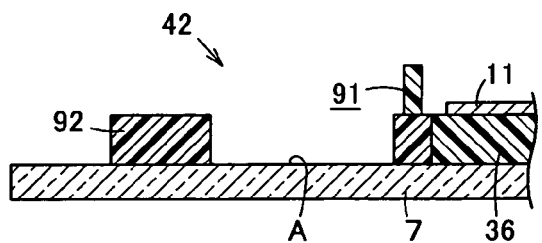
FIG. 29 is a diagram showing an eighth embodiment of the liquid crystal display device of the present invention.
Figure 30:
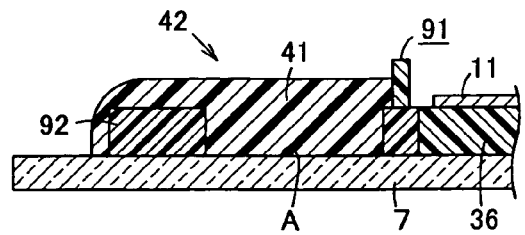
FIG. 30 is a diagram showing a ninth embodiment of the liquid crystal display device of the present invention.

In this embodiment, the partition walls 91 and 92 are constructed by stepwise laminating two colored resin layers of different colors. However, as in the case of a sixth embodiment shown in FIG. 26, the upper stage portions 91b and 92b of the partition walls 91 and 92 may be formed so as to cover the lower stage portions 91a and 92a of the partition walls 91 and 92. Furthermore, as in the case of a seventh embodiment shown in FIGS. 27 and 28, the pair of partition walls 91 and 92 may be constructed by one layer or three layers, or as in the case of an eighth embodiment shown in FIG. 29, the inside partition wall 91 may be constructed by two layers and the outside partition wall 92 may be constructed by one layer. That is, the laminate construction of the colored resin is not specifically limited, and the laminate construction of the colored resin of the partition walls 91 and 92 may be properly set so that the light shielding layer 41 having a desired thickness can be formed. Here, in the case of a ninth embodiment in which the inside partition wall 91 is constructed by two layers and the outside partition wall 92 is constructed by one layer, by dropping the light shielding ink C into the bank A so as to run on the outside partition wall 92 as shown in FIG. 30, the light shielding layer 41 can be formed substantially at the same thickness as the case where each of the partition walls 91 and 92 is constructed by two layers.

Furthermore, in this embodiment, the color filter layer 33 and the light shielding portion 42 are formed in the array substrate 2, however, the color filter layer and the light shielding portion as described above may be formed in the counter substrate 3.

Next, a tenth embodiment will be described with reference to FIGS. 31 to 42. The same construction and action as each of the above-described embodiments are represented by the same reference numerals and the description thereof is omitted.

Figure 31:
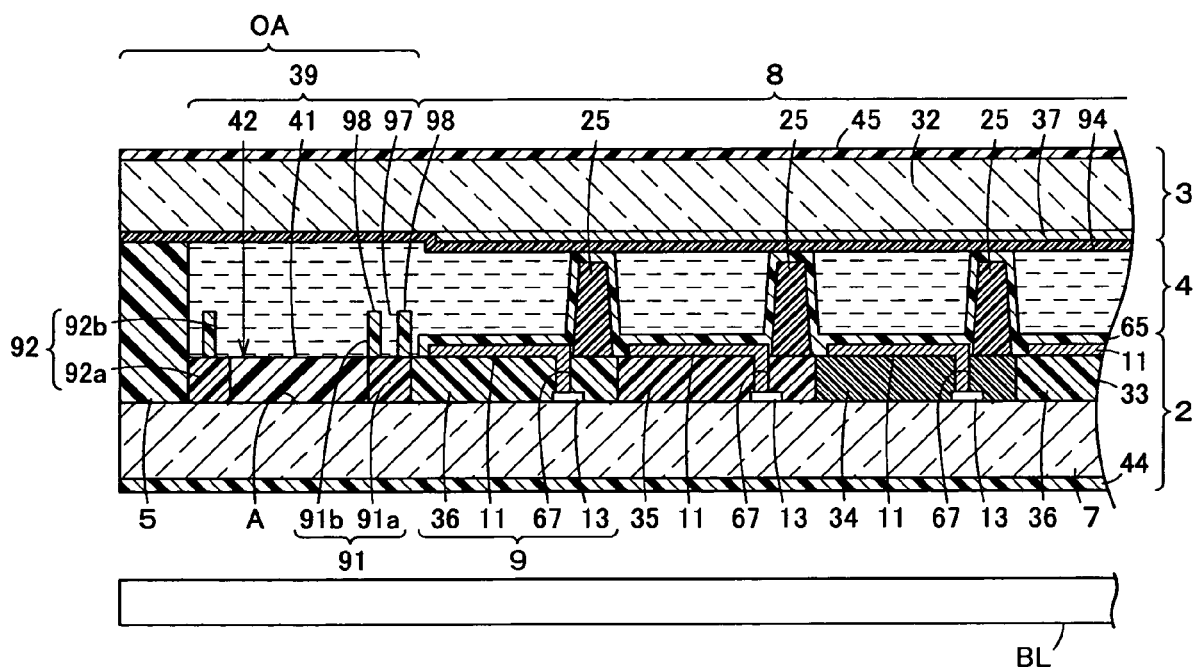
FIG. 31 is a cross-sectional view showing a tenth embodiment of the liquid crystal display device of the present invention.

As shown in FIG. 31, in the liquid crystal panel 1 of the tenth embodiment, a groove 97 caving downwardly along the partition wall 91 is formed on the upper surface of the upper stage portion 91b of the partition wall 91 at the inner peripheral side (that is, at the display frame portion 8 side) of the pair of partition walls 91 and 92. When the partition wall 91 at the inner peripheral side has a light transmissible property, a light shielding metal pattern (not shown) may be disposed below the partition wall 91.

The bank A is formed between the pair of partition walls 91 and 92 as described above, and the light shielding layer 41 is formed on the bank A.

Next, a method of producing the above-described liquid crystal panel 1 will be described.

Figure 32:
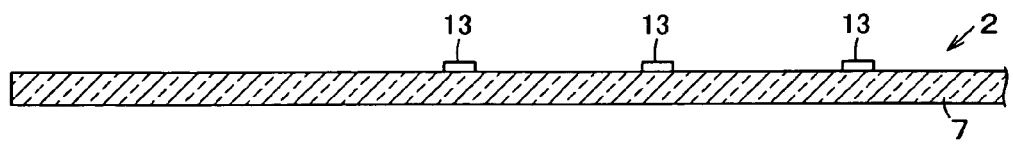
FIG. 32 is a diagram showing a state that a switching element is formed on the light transmissible substrate of the liquid crystal display device.
Figure 33:
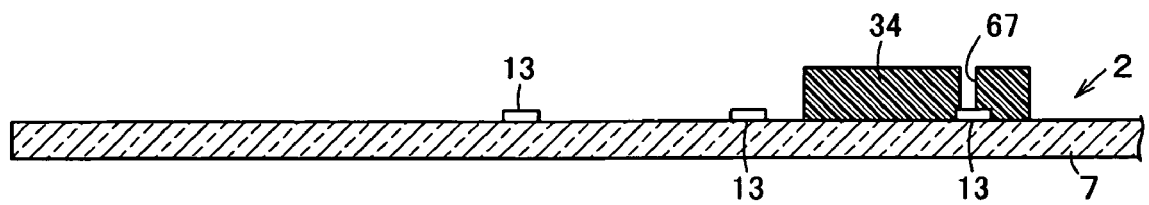
FIG. 33 is a diagram showing a state that a part of the color filter layer and the lower stage portion of the partition wall are formed on the light transmissible substrate.

As shown in FIG. 32, by the same step as the fifth embodiment, after the array substrate 2 in which the thin film transistors 13 and the electrode wirings are formed is formed, each of color filter portions 34, 35 and 36 of the color filter layer 33 is formed in connection with each color pixel 9, and a pair of partition walls 91 and 92 are formed in the light shielded area 39. At this time, ultraviolet curable acrylic resin resist dispersed with red pigment is coated on the whole surface of the substrate by a spinner, for example, and the resist film concerned is exposed to light of 365 nm in wavelength and 100 mJ/cm$^2$ in exposure amount via a photomask so that light is irradiated to the portions corresponding to the red pixels. The resist film concerned is developed for 40 seconds with 0.05% water solution of potassium hydroxide (KOH) containing an interfacial active agent, and baked at 230° C. for 3 minutes, whereby the red color filter portion 34 having a film thickness of 3.0 μm is formed as shown in FIG. 33.

Figure 34:
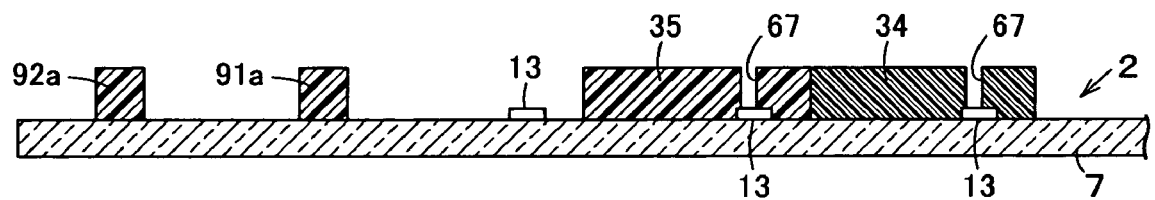
FIG. 34 is a diagram showing a state that another part of the color filter layer and the upper stage portion of the partition wall are formed on the light transmissible substrate.

Subsequently, a resist achieved by dispersing green pigment in an ultraviolet curable acrylic resin resist is coated on the whole surface of the substrate by a spinner, and under the same condition as above, the resist film concerned is exposed to light via a photomask so that light is irradiated to the portions corresponding to the green pixels and the portions corresponding to the partition walls 91 and 92 at the peripheral edge of the display frame portion 8, developed and then baked, whereby the green filter portion 35 having a film thickness of 3.0 μm is formed and also the lower stage portions 91a and 92a of the partition walls 91 and 92 formed of acrylic resin dispersed with green pigment are formed as shown in FIG. 34.

Figure 35:
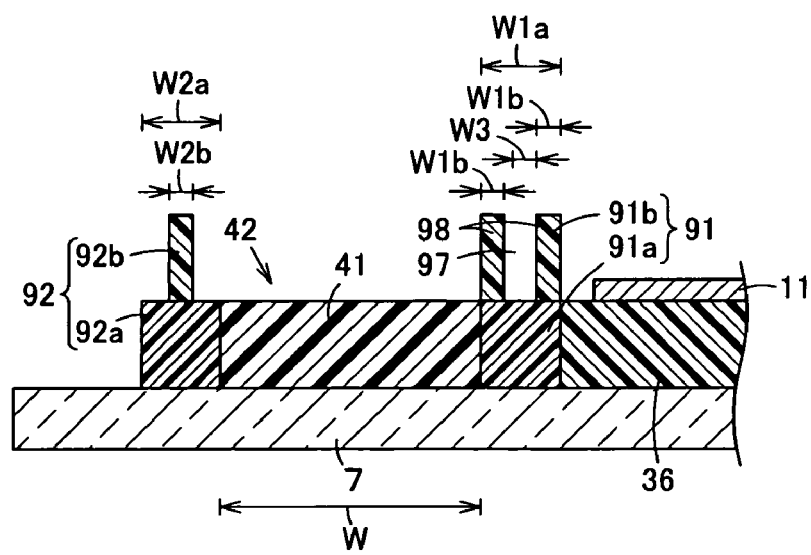
FIG. 35 is a diagram showing a state that the light shielding material coated between a pair of partition walls is cured.

The width dimension (line width) of the lower stage portions 91a and 92a of the partition walls 91 and 92 is not limited to a specific value insofar as it enables formation of the upper stage portions 91b and 92b of the partition walls 91 and 92 formed on the upper surface of the lower stage portions 91a and 92a. For example, in this embodiment, as shown in FIG. 35, the width dimensions W1a and W2a of the lower stage portions 91a and 92a are set to 70 μm. Also, the dimension W of the space between the lower stage portion 91a of the partition wall 91 and the lower stage portion 92a of the partition wall 92 may be properly set in connection with the dimension of the light shielded area required in the liquid crystal panel 1 to be manufactured. In this embodiment, for example, the dimension W is set to 1 to 7 mm.

Figure 36:
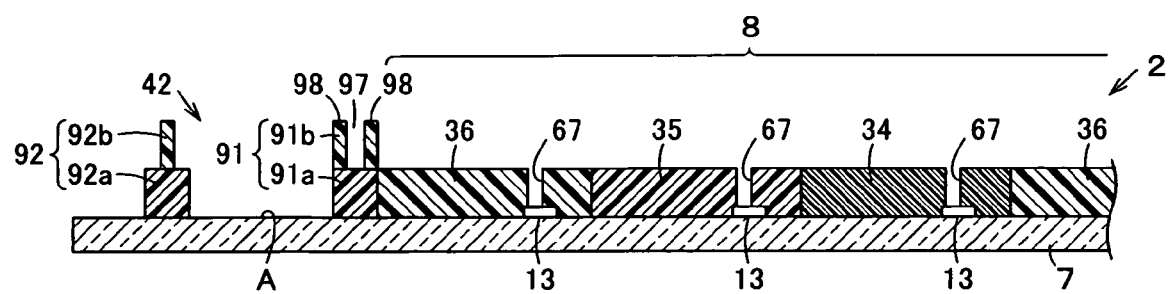
FIG. 36 is a diagram showing a state that still another part of the color filter layer of the color filter is formed on the light transmissible substrate.

Subsequently, by repeating the coating of the same ultraviolet curable acrylic resin resist, the photolithography process and the baking, the blue filter portion 36 having a film thickness of 3.0 μm is formed and also the upper stage portions 91b and 92b of the partition walls 91 and 92 formed of acrylic resin dispersed with blue pigment are formed on the upper surface of the lower stage portions 91a and 92a of the partition walls 91 and 92 as shown in FIG. 36, whereby the groove-shaped bank A having a depth of 5.5 μm is formed in the light shielded area 39 between the partition walls 91 and 92. Here, a pair of resin layers 98 and 98 formed of acrylic resin dispersed with blue pigment are arranged on the upper surface of the lower stage portion 91a at the inner peripheral side so as to be spaced from each other at a predetermined interval, whereby the upper stage portion 91b having a groove 97 caved downwardly is formed on the lower stage portion 91a.

The width dimension of the upper stage portions 91b and 92b of the partition walls 91 and 92 is not limited to a specific value insofar as it is not less than the limit resolution (line width) at which the ultraviolet curable acrylic resin constituting the upper stage portions 91b and 92b can secure predetermined adhesion strength. For example, in this embodiment, as shown in FIG. 35, the width dimension W2a of the resin layers 98 and 98 constituting the upper stage portion 91b of the inside partition wall 91 is set to 20 μm, the interval W3 between the resin layers 98 and 98 is set to 20 μm and the width dimension W2b of the upper stage portion 92b of the partition wall 92 at the outer peripheral side is set to 20 μm.

Subsequently, the array substrate 2 in which the color filter layer 33 and the partition walls 91 and 92 are formed is baked at 220° C. for 60 minutes, thereby perfectly curing the acrylic resin.

In the steps of forming the respective color filter portions 34, 35 and 36, the through holes 67 and the contact holes 85 are also formed at the same time.

Figure 37:
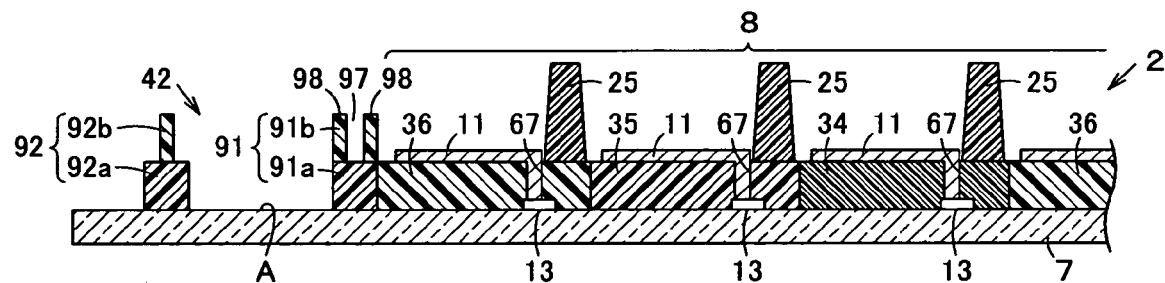
FIG. 37 is a diagram showing a state that pixel electrodes and spacers are formed on the color filter layer.

Subsequently, ITO is formed at a thickness of 150 nm on the color filter layer 33 by the sputtering method, and patterned into a predetermined pixel pattern, thereby forming the pixel electrode 11 in contact with the thin film transistor 13. Subsequently, ultraviolet curable acrylic resin resist is coated at a predetermined film thickness on the whole surface of the substrate by a spinner. The resin material concerned is heated and dried, and then exposed to ultraviolet rays having a prescribed exposure amount by using a photomask having a predetermined pattern. The resin material concerned is developed with alkaline water solution, and heated and baked for a predetermined time, whereby the spacers 25 having a height of 5.5 μm are formed at predetermined positions on the color filter layer 33 while avoiding the pixel electrodes 11 of the substrate surface as shown in FIG. 37.

Figure 38:
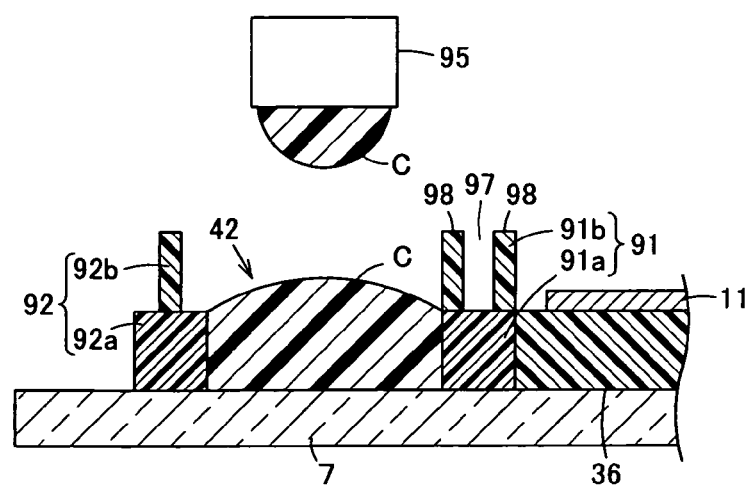
FIG. 38 is a diagram showing a state that the light shielding material is coated between a pair of partition walls.
Figure 39:
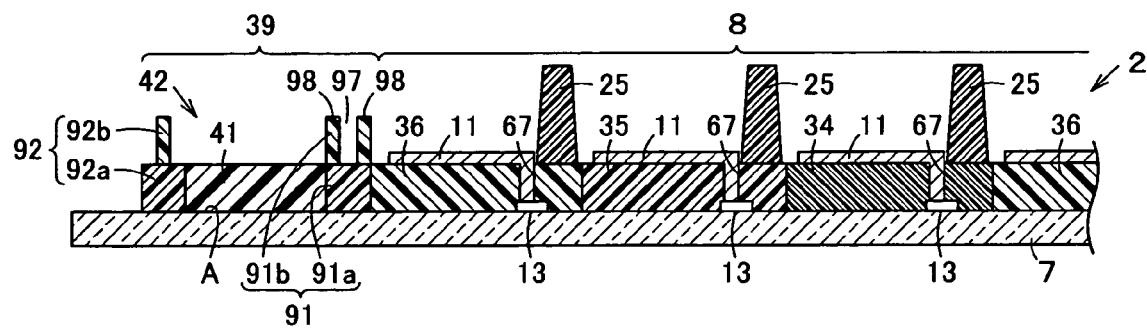
FIG. 39 is a diagram showing a state that the light shielding layer is formed between a pair of partition walls.
Figure 40:
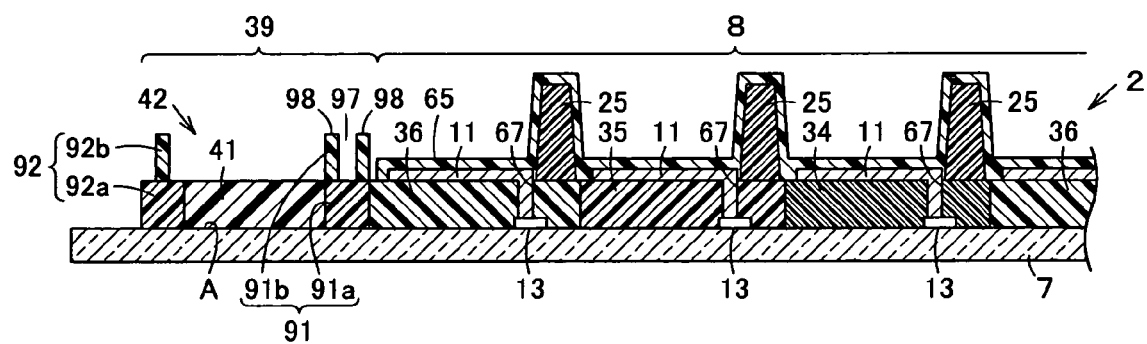
FIG. 40 is a diagram showing a state that orientation film is formed on the light transmissible substrate.

Subsequently, as shown in FIG. 38, the light shielding ink C is jetted from the ink jet nozzle 95 into the bank A formed between the partition walls 91 and 92 to coat the light shielding ink C in the bank A. In this case, it is preferable that the jetting position to which the ink jet nozzle 95 jets the light shielding ink C is determined so that the jetting distance in the jetting direction from the jetting port of the ink jet nozzle 95 to the upper ends of the upper stage portions 91b and 92b of the partition walls 91 and 92 is set to 60 μm to 90 μm. The solvent is removed under pressure-reduced atmosphere, and then the heating and baking are carried out to cure the acrylic monomer to thereby form the light shielding layer 41 formed of black resin in the bank A as shown in FIG. 39. Furthermore, the orientation film 65 is formed in the same step as the fifth embodiment, thereby manufacturing the array substrate 2 as shown in FIG. 40.

In this embodiment, the light shielding ink C containing thermosetting resin cured by the heating treatment is used. However, in place thereof, light shielding ink containing photocurable resin cured by light irradiation may be used.

As described above, according to the tenth embodiment, in the step of forming the color filter layer 33, the color filter layer 33 is formed in the display frame portion 8, and also the partition walls 91 and 92 forming the bank A for damming the light shielding ink C in the light shielded area 39 can be formed. Therefore, the light shielding layer 41 can be formed at a predetermined position of the outer peripheral portion of the display frame portion 8 by the ink jet system without requiring another step and also without expansion of the light shielding ink C to the peripheral edge portion of the array substrate 2, whereby the use efficiency of raw materials can be enhanced and the manufacturing cost can be reduced.

Also, the groove 97 is provided to the upper stage portion 91b of the partition wall 91 at the inner peripheral side. Therefore, even when the light shielding ink C jetted from the ink jet nozzle 95 reaches the upper end of the partition wall 91 at the inner peripheral side, the light shielding ink C flows into the groove 97 and is dispersed therein, so that the flowing force is weakened. Accordingly, the light shielding ink C can be dammed and prevented from flowing out to the display frame portion 8.

Figure 41:
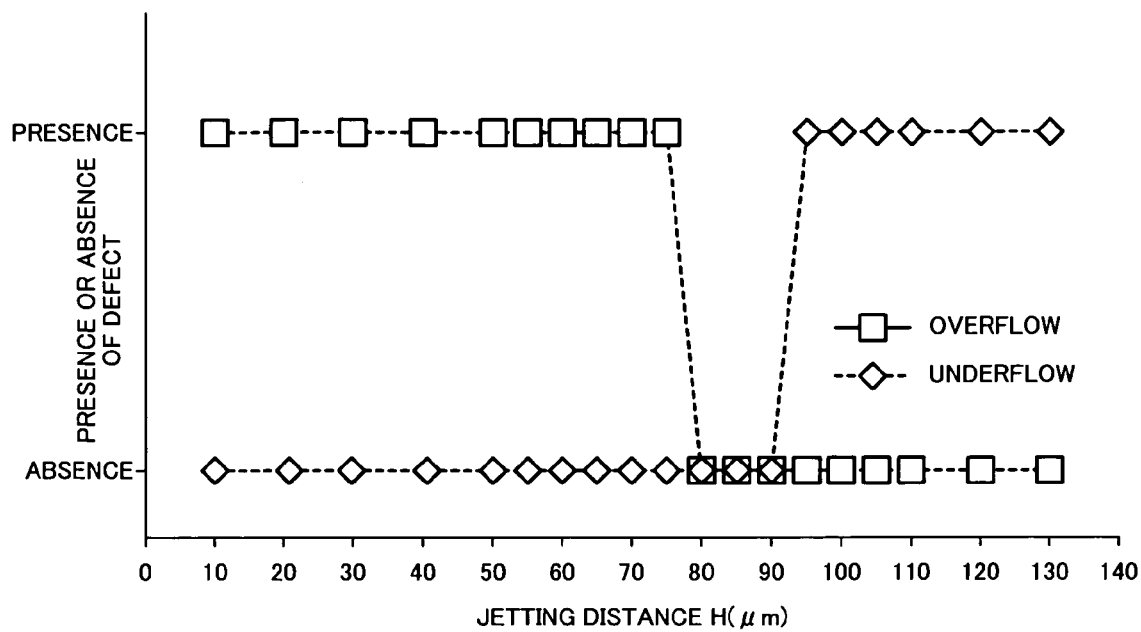
FIG. 41 is a graph showing the relationship between the jetting distance of an ink jet nozzle and the presence or absence of defective jetting of the light shielding material and also a graph showing a case where no groove is provided to the upper stage portion of the partition wall.
Figure 42:
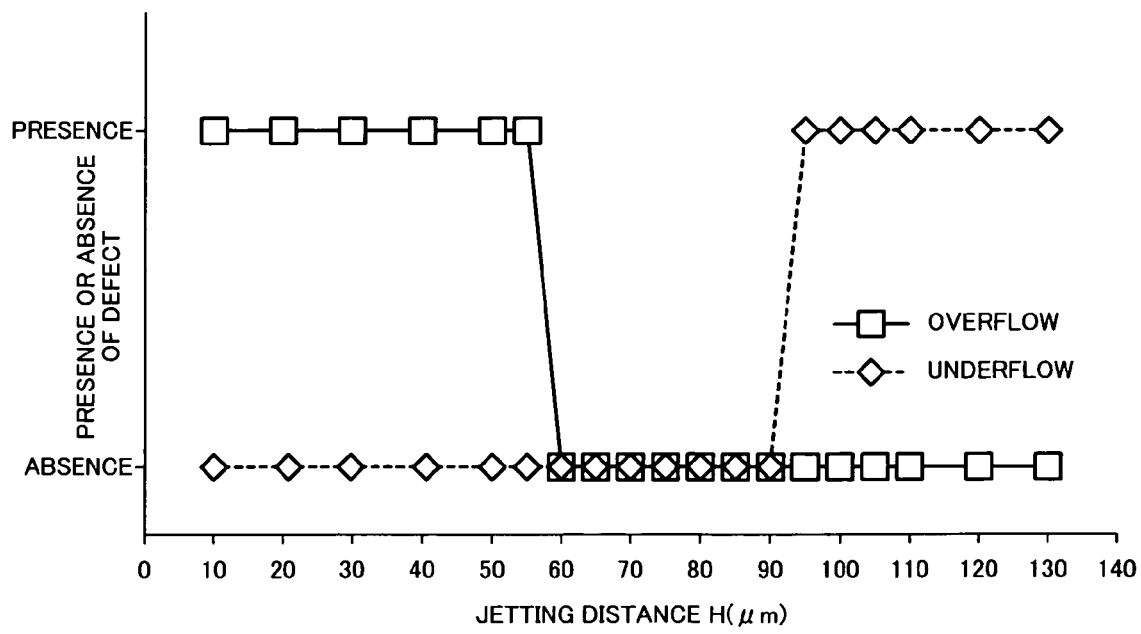
FIG. 42 is a graph showing the relationship between the jetting distance of the ink jet nozzle and the presence or absence of defective jetting of the light shielding material and also a graph showing a case where a groove is provided to the upper stage portion of the partition wall.

This is also apparent from FIGS. 41 and 42 showing the relationship between the jetting distance H in the jetting direction from the jetting port of the ink jet nozzle 95 to the upper ends of the upper stage portions 91b and 92b of the partition walls 91 and 92 when the ink jet nozzle 95 jets the light shielding ink C into the bank A and the presence or absence of defective jetting of the light shielding ink C in the case where the groove 97 is formed at the upper stage portion 91b of the partition wall 91 at the inner peripheral side and in the case where no groove 97 is formed at the upper stage portion 91b.

That is, in the case where no groove 97 is formed, as shown in FIG. 41, the light shielding ink C does not flow out to the display frame portion 8 when the jetting distance H is equal to 80 μm or more, and no defective formation of the light shielding layer 41 occurs when the jetting distance H is equal to 90 μm or less. Accordingly, the range of the jetting distance H in which no defective jetting of the light shielding ink C occurs is from 80 μm to 90 μm.

On the other hand, in the case where the groove 97 is formed, as shown in FIG. 42, the light shielding ink C does not flow out to the display frame portion 8 when the jetting distance H is equal to 60 μm or more, and no defective formation of the light shielding layer 41 occurs when the jetting distance H is equal to 90 μm or less. Therefore, the range of the jetting distance H in which no defective jetting of the light shielding ink C occurs is from 60 μm to 90 μm, which is tripled compared to the case where the no groove 97 is formed. Even when there is some variation in the device condition, the shape of the partition walls 91 and 92, etc., the light shielding ink C does not flow out to the display frame portion 8 and the light shielding layer 41 can be stably formed.

Furthermore, the light shielding layer 41 and the color filter layer 33 disposed at the outermost periphery of the frame portion 8 (the blue color filter portion 36 in this embodiment) are not adjacent to each other, and thus, no color mixture occurs between both the layers.

In the tenth embodiment, the lower stage portions 91a and 92a and the upper stage portions 91b and 92b of the pair of partition walls 91 and 92 are formed of green colored resin and blue colored resin, respectively. However, the present invention is not limited to this embodiment, and they may be formed of colored resin of any color constituting the color filter portions 34, 35 and 36 of the color filter layer 33.

Figure 43:
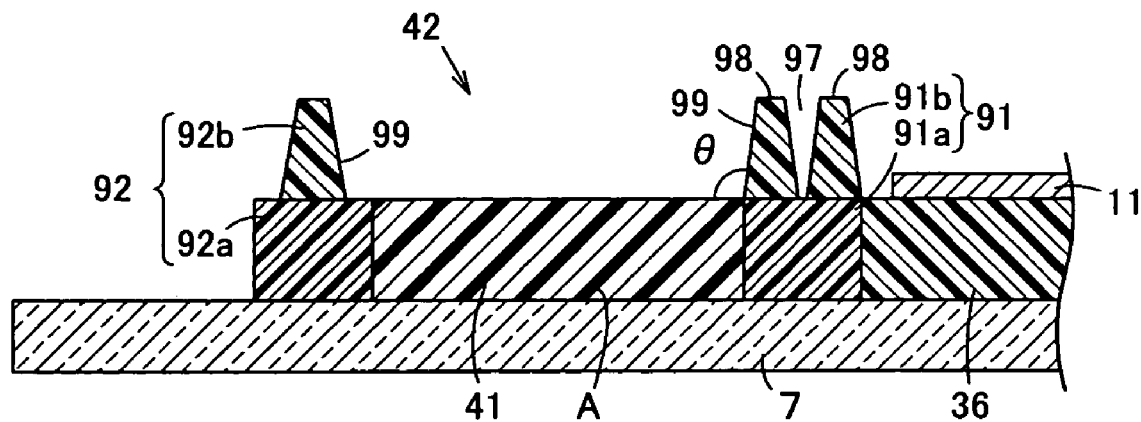
FIG. 43 is a diagram showing an eleventh embodiment of the present invention.

As in an eleventh embodiment shown in FIG. 43, in the tenth embodiment, the side surfaces of the upper stage portions 91b and 92b of the partition walls 91 and 92 which correspond to the side surfaces of the upper end portions of the pair of partition walls 91 and 92 may be designed as tapered surfaces 99 at an angle of 25 to 150 degrees to the glass substrate 7. Even in such a case, the light shielding ink C jetted from the ink jet nozzle 95 can be prevented from flowing out to the display frame portion 8.

In each of the above-described embodiments, the colored layers of three colors of the red color filter portion 34, the green color filter portion 35 and the blue color filter portion 36 are used. However, the present invention is not limited thereto, and colored layers of four colors of the red color filter portion 34, the green color filter portion 35, the blue color filter portion 36 and a transparent color filter portion may be used.

Figure 44:
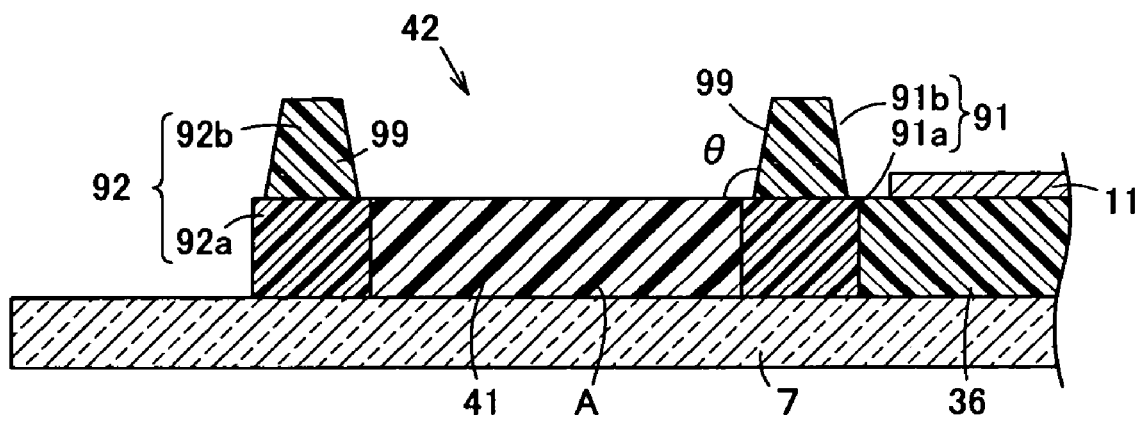
FIG. 44 is a diagram showing a twelfth embodiment of the present invention.

Next, a twelfth embodiment will be described with reference to FIG. 44. The same construction and action as the tenth embodiment are represented by the same reference numerals, and the description thereof is omitted.

The twelfth embodiment is different from the tenth embodiment in that the groove 97 is not formed at the upper stage portion 91b of the partition wall 91 at the inner peripheral side in the tenth embodiment and also the side surfaces of the upper stage portions 91b and 92b of the partition walls 91 and 92 are designed as tapered surfaces 99. The tapered surface 99 is formed so that the taper angle θ to the glass substrate 7 ranges from 25 to 150 degrees, preferably ranges from 90 to 120 degrees.

The taper angle θ of the tapered surface 99 can be adjusted by controlling the developing time of the resist film after light exposure, or by controlling the resist material, the light exposure amount, the baking condition or the like.

As described above, according to this embodiment, the upper stage portions 91b and 92b of the partition walls 91 and 92 are designed as the tapered surfaces 99, so that the light shielding ink C jetted from the ink jet nozzle 95 can be prevented from flowing out to the display frame portion 8.

In the twelfth embodiment, each of the partition walls 91 and 92 is constructed by stepwise laminating two layers of colored resin of different colors. However, each of the partition walls 91 and 92 may be constructed by one layer or three layers. Or, the partition wall 91 at the inner peripheral side may be constructed by two layers while the partition wall 92 at the outer peripheral side is constructed by one layer. That is, the laminate construction of the colored resin is not specifically limited, and the laminate construction of the colored resin of the partition walls 91 and 92 may be properly set so that the light shielding layer 41 having a desired thickness can be formed. In this case, the side surface of the colored resin layer formed at the uppermost stage, that is, the side surface of the upper end portion of each of the pair of partition walls 91 and 92 is provided as the tapered surface 99, so that the light shielding ink C can be prevented from flowing out to the display frame portion 8.

What is claimed is:

1. A method of producing a liquid crystal display device comprising, on a light transmissible substrate, pixels that are arranged in a display area for displaying an image and have a color filter layer including colored layers of a plurality of colors and the color filter layer formed by resin resist, and a light shielding layer for light-shielding a light shielded area arranged along an outside portion of the display area, the method comprising:

forming the color filter layer on the light transmissible substrate, so that when the color filter layer is formed of the colored layers of a plurality of colors, a first color filter layer and a pair of partition wall lower stage portions are formed of a first colored resin of a first color, the pair of partition wall lower stage portions spaced from each other at a predetermined interval, surround the outside portion of the display area and the light shielded area, and constitute a part of a dam pattern, and a second color filter layer and a partition wall upper stage portion are formed of a second colored resin of a second color, the partition wall upper stage portion serving as an other portion of the dam pattern on an upper surface of at least the partition wall lower stage portion at an inner peripheral side of the pair of partition wall lower stage portions; and forming the light shielding layer, so that when the light shielding layer is formed, ink having a light shielding material is dropped from an ink jet nozzle onto an upper surface of the light transmissible substrate between the pair of partition wall lower stage portions, the light shielding layer formed so as to surround the display area at the light shielded area between an outer peripheral side of the pair of partition wall lower stage portions and the display area.

2. The liquid crystal display device producing method according to claim 1, wherein when the color filter layer is successively formed of the colored layers of a plurality of colors, the colored layer located at an outermost side of the color filter layer and the dam pattern are formed by laminating the colored layers of different colors; and the light shielding material is injected between the colored layer located at the outermost side of the color filter layer thus laminated and the dam pattern to form the light shielding layer.

3. The liquid crystal display device producing method according to claim 1, wherein the dam pattern is a pair of partition walls that are disposed so as to be spaced from each other at the predetermined interval and surround an outside portion of the display area and the light shielded area, and side surfaces of the pair of partition walls are designed as tapered surfaces; and when the light shielding layer is formed, ink having the light shielding resin material is dropped from the ink jet nozzle onto the upper surface of the light transmissible substrate between the pair of partition walls.

4. The liquid crystal display device producing method according to claim 1, wherein the light transmissible substrate is an array substrate having switching elements arranged in a matrix form and pixel electrodes connected to the switching elements.

5. A method of producing a liquid crystal display device comprising, on a light transmissible substrate, pixels that are arranged in a display area for displaying an image and have a color filter layer including colored layers of a plurality of colors and the color filter layer formed by resin resist, and a light shielding layer for light-shielding a light shielded area arranged along an outside portion of the display area, the method comprising:

forming the color filter layer on the light transmissible substrate, so that when the color filter layer is formed of the colored layers of a plurality of colors, a first color filter layer and a pair of partition wall lower stage portions are formed of a first colored resin of a first color, the pair of partition wall lower stage portions spaced from each other at a predetermined interval, surround the outside portion of the display area and the light shielded area, and constitute a part of a dam pattern, and a second color filter layer and partition wall upper stage portions are formed of a second colored resin of a second color, the partition wall upper stage portions forming a groove along an associated partition wall and the partition wall upper stage portions serving as an other portion of the dam pattern on the upper surface of at least the partition wall lower stage portion at the inner peripheral side of the pair of partition wall lower stage portions; and forming the light shielding layer, so that when the light shielding layer is formed, ink having a light shielding material is dropped from an ink jet nozzle onto an upper surface of the light transmissible substrate between the pair of partition wall lower stage portions, the light shield layer formed so as to surround the display area at the light shielded area between an outer peripheral side of the pair of partition wall lower stage portions and the display area.

6. The liquid crystal display device producing method according to claim 5, wherein when the color filter layer is successively formed of the colored layers of a plurality of colors, the colored layer located at an outermost side of the color filter layer and the dam pattern are formed by laminating the colored layers of different colors; and the light shielding material is injected between the colored layer located at the outermost side of the color filter layer thus laminated and the dam pattern to form the light shielding layer.

7. The liquid crystal display device producing method according to claim 5, wherein a distance from a jetting port of the ink jet nozzle to the upper end of the partition wall upper stage portion is set to 60 μm to 90 μm when ink is dropped from the ink jet nozzle.

8. The liquid crystal display device producing method according to claim 5, wherein the dam pattern is a pair of partition walls that are disposed so as to be spaced from each other at the predetermined interval and surround an outside portion of the display area and the light shielded area, and side surfaces of the pair of partition walls are designed as tapered surfaces; and when the light shielding layer is formed, ink having the light shielding resin material is dropped from the ink jet nozzle onto the upper surface of the light transmissible substrate between the pair of partition walls.

9. The liquid crystal display device producing method according to claim 5, wherein the light transmissible substrate is an array substrate having switching elements arranged in a matrix form and pixel electrodes connected to the switching elements.

* * * * *